(12) United States Patent
Rosenqvist et al.

(10) Patent No.: US 12,065,106 B2
(45) Date of Patent: Aug. 20, 2024

(54) WHEEL HOLDER AND LOAD CARRIER ATTACHMENT DEVICES FOR A VEHICLE

(71) Applicant: Thule Sweden AB, Hillerstorp (SE)

(72) Inventors: Klara Rosenqvist, Jönköping (SE); Simon Stråth, Jönköping (SE); Anders Nilvius, Värnamo (SE); Andreas Arvidsson, Sävsjö (SE); Hannes Olaison, Falun (SE)

(73) Assignee: Thule Sweden AB, Hillerstorp (SE)

( * ) Notice: Subject to any disclaimer, the term of this patent is extended or adjusted under 35 U.S.C. 154(b) by 56 days.

(21) Appl. No.: 17/121,136

(22) Filed: Dec. 14, 2020

(65) Prior Publication Data

US 2021/0188186 A1    Jun. 24, 2021

(30) Foreign Application Priority Data

Dec. 20, 2019 (EP) .................................... 19218426
Jun. 24, 2020 (EP) .................................... 20182007

(51) Int. Cl.
*B60R 9/10* (2006.01)
*B62H 3/04* (2006.01)

(52) U.S. Cl.
CPC .................................... *B60R 9/10* (2013.01); *B62H 3/04* (2013.01)

(58) Field of Classification Search
CPC ........................................................ B60R 9/10
See application file for complete search history.

(56) References Cited

U.S. PATENT DOCUMENTS

| | | | | |
|---|---|---|---|---|
| 4,378,883 | A * | 4/1983 | Profeta | B60R 9/10 224/535 |
| 5,476,201 | A * | 12/1995 | Hall | B60R 9/10 224/326 |
| 5,860,786 | A | 1/1999 | Aubrecht | |
| 6,283,310 | B1 * | 9/2001 | Dean | B60R 9/10 211/20 |
| 6,681,971 | B2 * | 1/2004 | Laverack | B60R 9/045 224/558 |
| 8,496,145 | B2 * | 7/2013 | Sautter | B60R 9/10 224/924 |
| 2003/0019258 | A1 | 1/2003 | Irgens et al. | |
| 2006/0273124 | A1 * | 12/2006 | Bogoslofski | B62H 3/00 224/441 |

(Continued)

FOREIGN PATENT DOCUMENTS

DE    102008047509 B4     8/2010
DE    102013020556 A1 *   6/2014    ............... B60R 9/10

(Continued)

*Primary Examiner* — Scott T McNurlen
(74) *Attorney, Agent, or Firm* — Sterne, Kessler, Goldstein & Fox P.L.L.C.

(57) ABSTRACT

The present disclosure relates to a wheel holder for a vehicle, preferably a bike front wheel holder, with a load connecting portion, which is preferably releasably attachable to a load carrier, and a wheel holding member, wherein the wheel holder comprises a docking device configured for releasable attachment of the wheel holding member to the load connecting portion to allow for attachment of a wheel to the wheel holding member at a location remote from the load connecting portion. Furthermore, the present disclosure relates to load carrier attachment devices.

26 Claims, 11 Drawing Sheets

(56) References Cited

U.S. PATENT DOCUMENTS

| | | | |
|---|---|---|---|
| 2008/0011795 A1* | 1/2008 | Howorth | B60R 9/10 |
| | | | 224/321 |
| 2011/0139842 A1* | 6/2011 | Sautter | B60R 9/048 |
| | | | 224/324 |
| 2013/0270412 A1* | 10/2013 | Bogoslofski | E05B 65/00 |
| | | | 70/357 |
| 2014/0143990 A1 | 5/2014 | Sautter et al. | |

FOREIGN PATENT DOCUMENTS

| | | | | |
|---|---|---|---|---|
| FR | 2332155 A | * | 7/1977 | ............ B60R 9/10 |
| JP | 2000318538 A | * | 11/2000 | |
| JP | 2012116281 A | * | 6/2012 | |

* cited by examiner

Fig. 3
Fig. 4
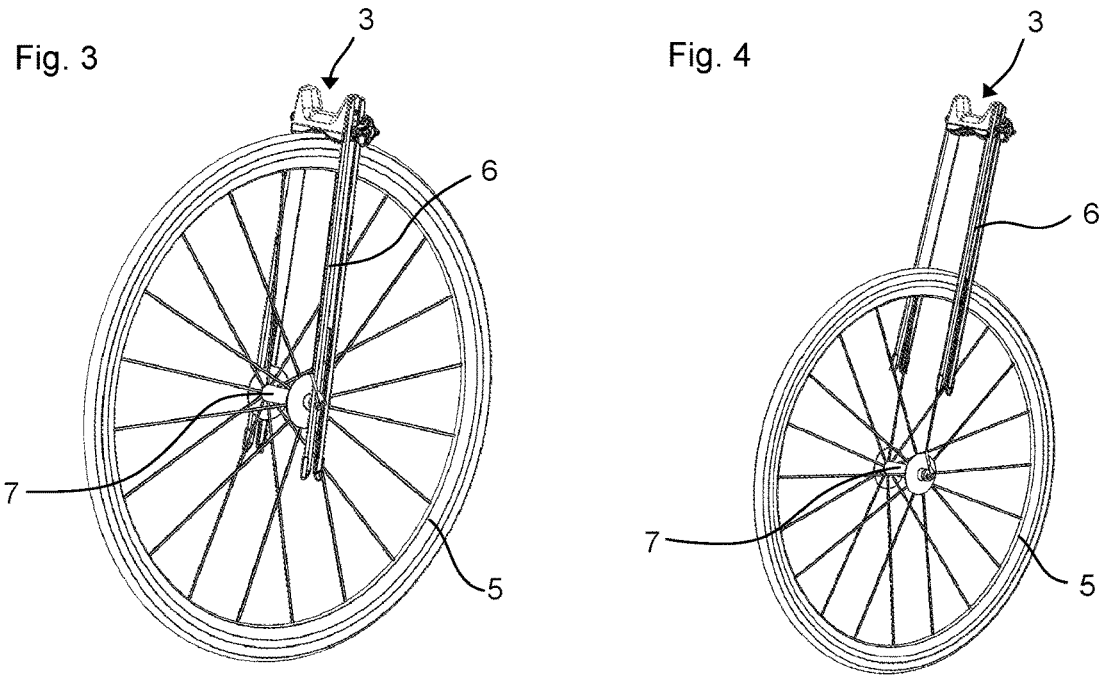
Fig. 5
Fig. 6
Fig. 7
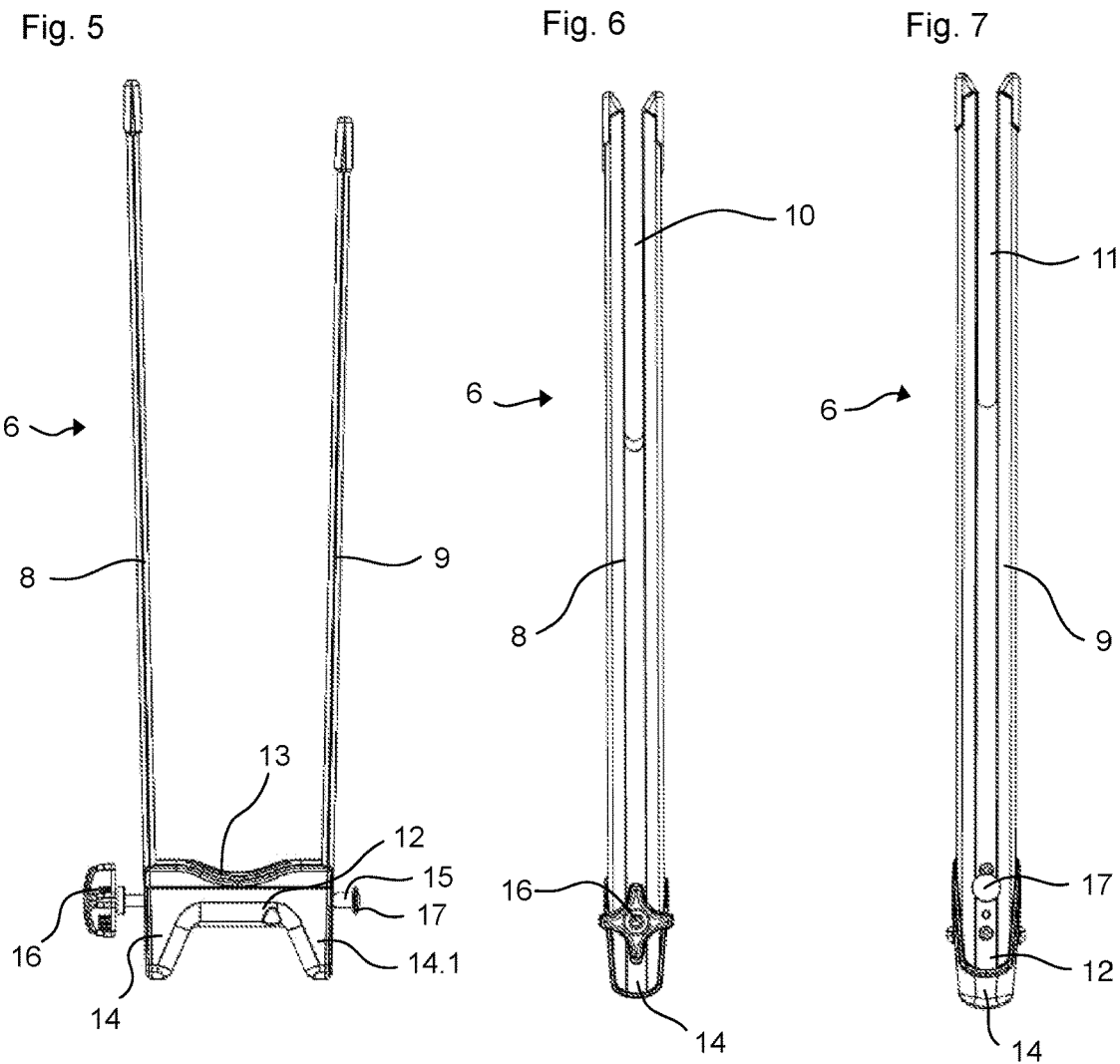

WHEEL HOLDER AND LOAD CARRIER ATTACHMENT DEVICES FOR A VEHICLE

CROSS REFERENCE TO RELATED APPLICATIONS

This application claims priority to EP Application No. 19218426.5, filed Dec. 20, 2019, and EP Application No. 20182007.3, filed Jun. 24, 2020, which also claims priority to EP Application No. 19218426.5. Each of these applications is hereby incorporated herein in its entirety by reference.

TECHNICAL FIELD

The present disclosure relates to a wheel holder for a vehicle, preferably a bike front wheel holder. The disclosure further relates to load carrier attachment devices. The wheel holder and the load carrier attachment devices may be attachable to a load carrier of a vehicle, e.g. a roof rack, for transporting a wheel or any other type of load by a vehicle. The load carrier attachment devices may comprise an adapter for allowing attachment to different types of cross bars. The load carrier attachment devices may feature an anti-theft function for preventing unauthorized detachment of the load carrier from the vehicle and/or the load from the load carrier.

BACKGROUND

A load carrier allows for transportation of additional loads, in particular bulky items such as sport equipment, with a motor vehicle. Common requirements when using load carriers are that the load is transported safely and that handling of the load and its attachment to the vehicle is simple. Another common requirement is preventing theft of loads and load carrier attachment devices, such as wheel holders, as both are commonly attached to the exterior of a vehicle. DE 10 2008 047 509 B4 describes a bike wheel holder that may be adjusted between an upright configuration and a lowered configuration. US 2013/0270412 A1 describes a lockable carrier mount.
US 2014/0143990 A1 describes an attachment device for vehicle rooftop rack accessories.

SUMMARY

A first aspect relates to a wheel holder for a vehicle, preferably a bike front wheel holder. The wheel holder may be used to attach a wheel to an exterior of the vehicle, for example to a roof, e.g. a cross bar on a rooftop, and/or a rear, e.g. a read lid, of the vehicle. The vehicle may be a motor vehicle, e.g. a car, van, RV, caravan or truck. It is also possible that the wheel holder is attachable, e.g. via a load carrier, to the bed of a pickup truck. The vehicle may also be a ship or any other type of vehicle. The wheel holder comprises a load connecting portion, which is preferably formed as a load connecting member and is releasably attachable to a load carrier. The load carrier may comprise one or several cross bars to which the load connecting member may be attached. Alternatively, the load connecting portion may be formed integrally with the load carrier and/or a vehicle. The wheel holder comprises a wheel holding member, which is preferably configured for the releasable attachment of a wheel, in particular a bike wheel. The wheel holder further comprises a docking device configured for releasable attachment of the wheel holding member to the load connecting portion to allow for an attachment of a wheel to the wheel holding member at a location remote from the load connecting portion when the latter is mounted to a load carrier in the intended fashion. The docking device may be embodied by sections of the wheel holding member and/or the load connecting portion.

The docking device allows the wheel to be attached to the wheel holding member at a comfortable position, for example on the ground. By comparison, when the load connecting portion is already mounted to the roof top of the vehicle, it may be difficult to reach the wheel holding member for attachment of the wheel. Further, the docking device may be configured for an easier attachment of the wheel holding member to the load connecting portion as compared to the attachment of the wheel to the wheel holding member. In addition, the attachment of the load connecting portion to the load carrier without the wheel holding member attached to the load connecting portion may be easier than mounting the entire wheel holder to the load carrier of the vehicle. Overall, the present disclosure provides a wheel holder for a vehicle with an improved user friendliness.

The wheel holder may be configured such that by moving the wheel holding member towards the load connecting portion, the docking device is brought into a holding state in which it holds the wheel holding member against gravity. Preferably, the docking device is brought into the holding state by only moving the wheel holding member towards the load connecting portion. In other words, no actuation of any further means is necessary for bringing about the holding state. In the holding state, the wheel holding member may exhibit a determined position and orientation with respect to the load connecting portion. In the holding state, the docking device absorbs at least a portion or all of the gravity force acting on the wheel holding member. In the holding state, the wheel holding member may be fixed to the load connecting portion such that a removal from the load connecting portion is only possible by actuating additional means, e.g. additional release and/or fixation means. Likewise, in the holding state, the load connecting portion may simply be held in position against gravity by the docking device such that it may be removed from the load connecting portion without actuating any additional means. In any case, the docking device is configured to hold the wheel holding member against gravity in the holding state such that the position and orientation of the wheel holding member with respect to the load connecting portion is determined. In the holding state, the wheel holding member may be arranged in an upright orientation on the load connecting portion. This embodiment provides the advantage that the wheel holding member may be easily attached to the load connecting portion. Specifically, an operator must only move the wheel holding member towards the load connecting portion to arrange the wheel holding member thereon. While the wheel holding member is held by the docking device in the holding state, the operator may actuate a fixation device for fixing the wheel holding member to the load connecting portion without being required to hold the wheel holding member in position, for example. This simplifies assembly.

The wheel holder, e.g. the docking device, may comprise a magnetic guiding system for guiding the wheel holding member into its position on the load connecting portion. For example, the wheel holding member may comprise a first magnet and the load connecting portion a second magnet for guiding the wheel holding member into its desired position on the load connecting portion when being moved towards the load connecting portion. Additionally or alternatively, the wheel holder, e.g. the docking device, may comprise magnets, which may be the magnets of the guiding system, to hold the wheel holding member in position, e.g. in the holding state.

According to an embodiment of the wheel holder, the docking device is configured for releasable attachment of the wheel holding member to the load connecting portion in a first predetermined attachment position. The first predetermined position may relate to a specific arrangement of the wheel holding member relative to the load connecting portion, for example with respective corresponding connection elements for attachment in a mating position. The first predetermined position may facilitate attachment as the user does not need to adjust the wheel holding member relatively to the load connecting portion to a desired position. Predetermined may, for example, be understood as the position being defined by structural and/or functional elements of the wheel holder. For example, the connection elements may determine the attachment position and/or may only connect in a predefined attachment position such as the predetermined first attachment position. Preferably, the docking device is configured for releasable attachment of the wheel holding member to the load connecting portion in the first and in a second predetermined attachment position. This may allow for adjustment of the wheel holding member between two predefined positions according to user requirements. For example, the first attachment position may be intended for holding a wheel with the wheel holder while the second position may reduce the stature of the wheel holder. For example, the wheel holder may protrude less from the vehicle in the second attachment position. Preferably, the docking device is configured for releasable attachment of the wheel holding member to the load connecting portion only in the first and second predetermined attachment positions. Such a design prevents attachment of the wheel holding member to the load connecting portion in a disadvantageous arrangement. In particular, positions unsuitable for usage of the wheel holder with the vehicle, especially at high vehicle speeds, may be avoided. Further, restricting the attachment to exactly two positions prevents cumbersome search of a useful attachment position by the user, potentially also requiring fine adjustments and trial-and-error attachment procedures.

According to an embodiment of the wheel holder, the wheel holding member extends essentially upwards in an upright position in the first predetermined attachment position when the wheel holder is attached to the load carrier and the load carrier to the vehicle in the intended fashion. An upright position may correspond to an arrangement where the wheel holding member essentially extends in a vertical direction. Alternatively or additionally, the wheel holding member extends at a predetermined angle from the vertical, preferably at 5° to 20° backwards from a vertical position, more preferably 15°, in the first predetermined attachment position when the wheel holder is attached to the load carrier and the load carrier to the vehicle in the intended fashion. Such a first predetermined position may reduce drag during forward vehicle movement and/or may render the wheel holder more resistant to a strong headwind. Backwards may correspond to a vehicle backward direction. The above-described arrangement of the wheel holding member in the first predetermined attachment position is preferably a position, in which a wheel is held by the wheel holding member. Alternatively or additionally, the wheel holding member extends essentially horizontally in the second predetermined attachment position when the wheel holder is attached to the load carrier and the load carrier to the vehicle in the intended fashion. Such a flat or lowered position may result in a small stature of the wheel holder, possibly reducing drag and overall vehicle height. Preferably, in this second predetermined position, a wheel is not and cannot be attached to the wheel holding member. The second predetermined position may thus be a storage position.

According to an embodiment of the wheel holder, the wheel holding member may only be adjusted between the first and second predetermined attachment positions by releasing the wheel holding member from the load connecting portion. Such a design may prevent unwanted readjustment of the wheel holding member position, in particular due to external forces, such as those caused by a headwind.

According to an embodiment of the wheel holder, the docking device comprises at least one male member and at least one complementary female member, which define the first and/or second predetermined attachment position when engaged with each other. The male member may be provided by a protrusion on the wheel holding member or the load connecting portion. The female member may be provided by a recess on the wheel holding member or the load connecting portion. Usually, the male member is at least partially inserted into the female member in the first and/or second predetermined attachment position. The male and female members may provide a form-fit that defines the first and/or second predetermined attachment position. Male and complementary female members are reliable and simple elements for defining attachment positions. In particular, male and complementary female members may provide both guides for correct alignment of the wheel holding member with the load connecting portion as well as end-stops to hold the wheel holding member in position on the load connecting portion, in particular against gravity and/or without requiring a further fixation.

According to an embodiment of the wheel holder, the at least one male member is configured as a guiding protrusion. A guiding protrusion may at least partially define a movement path for bringing the wheel holding member and the load connecting portion in an attachment position, in particular the first and/or second predetermined attachment position. The guidance facilitates attachment for the user, preferably by already at least partially supporting the wheel holding member on the load connecting portion prior to arriving at the final attachment position. The guiding protrusion is preferably provided on the wheel holding member. Alternatively or additionally, the female member is configured as a trough shaped recess. A trough shaped recess is a simple design. Further, a corresponding male member may be easily inserted into the trough shaped recess by the user. Preferably, the trough shaped recess is provided on the load connecting portion. Such a design may be beneficial since the load connecting portion may be large enough to provide trough shaped recesses without impairing its structural integrity. The wheel holding member usually comprises smaller, elongated members, such as legs, for attachment of the wheel, which may easily be provided with guiding protrusions.

According to an embodiment of the wheel holder, an essentially flat surface of the wheel holding member and/or a protrusion of the load connecting portion define the predetermined second attachment position. Such a design is especially beneficial if the second attachment position is not intended for the wheel holder to hold a wheel but instead be free of any load. A flat surface usually does not require additional manufacturing steps. A protrusion on the load connecting portion may define the second attachment position with simple means. In particular, the protrusion on the load connecting portion may be configured to support the wheel holding member at its flat surface. Preferably, the predetermined second attachment position is also defined by a fixation device, in particular a clamping bolt. For example, the fixation device may fix one area of the wheel holding member to the load connecting portion while another, spaced apart area of the wheel holding member is resting on the protrusion of the load connecting portion.

According to an embodiment of the wheel holder, the docking device comprises a fixation device, which may be separate from any other devices of the docking device, for bringing the docking device into a fixation state in which the wheel holding member is fixed to the load connecting portion in the first and/or second predetermined attachment position. The fixation device may secure the wheel holding member in its attached position to the load connecting portion. For example, the fixation device may prevent unwanted detachment of the wheel holding member from the load connecting portion, for example due to external forces such as those caused by headwind or a user accidentally pulling on the wheel holding member. The fixation may cause an immobilization of the wheel holding member relative to the load connecting portion, preventing adjustment between the first and second attachment position and/or preventing releasing the wheel holding member from its attachment to the load connecting portion. The fixation device is preferably configured as a clamping device. A clamping device allows for a simple fixation and simple release of the fixation. A clamping connection is a simple connection and may support heavy loads and/or strong forces.

According to an embodiment of the wheel holder, the fixation device comprises a clamping bolt. A clamping bolt is a low-priced and reliable fixation means. For example, the clamping bolt may be configured as an elongated member, in particular configured to change its effective axial length by turning of at least a part of the clamping bolt. For that purpose, the clamping bolt may comprise threads. Alternatively or additionally, the clamping bolt may comprise a quick release lever for tightening and release of the fixation. Preferably, the clamping bolt comprises an actuation element, such as a turning handle and/or knob, at a first end. Alternatively or additionally, the clamping bolt may comprise a flared base, preferably at the opposite second end. A flared base may be an area that has a wider diameter than an adjacent elongated middle section of the clamping bolt. A transition between the base and the middle section is preferably provided as a step. The clamping bolt is preferably arranged at the wheel holding member.

Alternatively or additionally, the fixation device comprises at least one wall with a bearing recess for accommodating the clamping bolt. Preferably, the wall with the bearing recess is provided at the load connecting portion. The fixation device preferably comprises two walls, each having a bearing recess for accommodating the clamping bolt. For example, the two walls may be spaced apart from each other and/or the bearing recesses are arranged coaxial to each other. The bearing recesses may have identical shapes. The two walls may also be provided by two wall sections of a continuous wall, preferably with the two wall sections being arranged parallel and/or spaced apart from each other. The wheel holding member may be clamped in between said two walls via the clamping bolt to fix the wheel holding member to the load connecting portion, e.g. via a frictional fit. Any of the walls may comprise teeth for preventing a rotation of the wheel holding member and the load connecting portion with respect to each other. For example, the teeth may form-fittingly engage a part of the wheel holding member. The teeth may be formed by protrusions on the wall, in particular in the bearing recess or adjacent thereto. The wheel holding member and the load connecting portion may thus be fixated with respect to each other by a frictional and/or a form fit.

According to an embodiment of the wheel holder, the fixation device is configured for a snap-on connection of the wheel holding member to the load connecting portion. A snap-on connection is simple to handle and allows for a very fast connection of the wheel holding member to the load connecting portion. Preferably, the fixation device comprises a quick-release mechanism configured for disengaging the snap-on connection. For example, the quick-release mechanism may comprise a button configured to disengage a form-fit of the snap-on connection, for example by compressing a spring element and/or deflecting a cantilever of the snap-on connection.

According to an embodiment of the wheel holder, the docking device, when in the holding state, is configured to hold the wheel holding member in place when arranged on the load connecting portion without the wheel holding member being fixed to the load connecting portion preferably in the first and/or second predetermined attachment position. Such a design facilitates mounting of the wheel holding member to the load connecting portion. In particular, the user is not required to hold the wheel holding member in place until fixation is achieved. Preferably, the docking device is configured to hold the wheel holding member in place against gravity and/or with the wheel attached to the wheel holding member.

According to an embodiment, the wheel holder is configured such that by moving the wheel holding member towards the load connecting portion, preferably only by moving the wheel holding member towards the load connecting portion, the docking device is brought into a fixation state, in which the wheel holding member is fixed to the load connecting portion. In the fixation state, the wheel holding member may not be removed from the load connecting portion without actuating any means. The docking device may be configured as a click-in mechanism. In a click-in mechanism two parts may be interlocked with each other, preferably via a form fit, by relative movement of said parts with respect to each other.

The docking device, e.g. the click-in mechanism, may comprises a bolt, which is preferably provided on the wheel holding member, a receiving space for accommodating the bolt and a locking member for fixing the bolt in the receiving space in a locking position, the receiving space and the locking member preferably being provided on the load connecting portion. By moving the bolt into the receiving space, the locking member may be brought into the locking position to fix the bolt in the receiving space. The receiving space may be a U-shaped receiving space and/or the locking member may be a U-shaped pivotable locking arm. Furthermore, the docking device may comprise a blocking element for blocking the locking member in the locking position. The blocking element may be pivotable and exhibit a cam surface for engaging the locking member. The blocking element may function as a wedge for blocking the locking member in the locking position. In addition, for releasing the blocking element, the docking device may comprise a release lever which must be actuated for moving the blocking member to an unlocked position. In said unlocked position, the bolt may be removed from the receiving space by pulling it outwards, thereby pivoting the locking member to the unlocked position.

According to an embodiment of the wheel holder, the wheel holding member is configured as an essentially U-shaped element. Such a design is simple and cost-effective to manufacture. Further, the user can easily recognize where to attach the wheel. Preferably a bottom of the U-shaped element is configured for attachment to the load connecting portion. For example, the bottom may be a plastic piece, in particular formed by an injection molding process. Alternatively or additionally, each leg of the U-shaped element is configured for attachment of the wheel. For example, the legs may be formed as metal parts. The legs may be separate elements to the bottom, preferably being attached with a screw-connection. Alternatively or additionally, each leg of the U-shaped element is configured for receiving an end of an axle of the wheel. For example, the legs may each have at least one through hole or slit at an end opposite to the bottom. The slits may allow for mounting of wheels of different sizes to the wheel holder.

Preferably, the wheel holder comprises an adapter for attachment of a bike wheel with a through axle configuration. For example, the adapter may be configured as a sleeve. Said sleeve may be arranged around the axle of the bike wheel in between the legs of the wheel holding member to support against a clamping fixation with the bike wheel axis. The wheel holder is preferably configured for attachment of a wheel with an axle comprising a quick-release lever. Alternatively or additionally, the wheel holder may also comprise an axle, preferably with a quick-release lever. Said axle may be used for the attachment of the wheel, in particular the bike wheel. For example, the bike wheel axle usually used to mount the bike wheel to the bike may be used to mount the bike frame to another load carrier, such as a bike holder.

According to an embodiment of the wheel holder, the load connecting portion is configured as a load connecting member, which is configured to be releasably mounted to a first cross-sectional type of cross bar, preferably having a wing shape. The wheel holder may further comprise an adapter. The wheel holder may be configured to be mounted to a different, second cross-sectional type of cross bar, preferably having a rectangular shape, via the adapter. For that purpose, the adapter may be attached to the load connecting member. In particular, both the adapter and the load connecting member may be in contact with the cross bar when the wheel holder is mounted to the cross bar. The load connecting member is preferably configured for a releasable attachment to the adapter by a sliding motion, preferably in a direction along a longitudinal extension of the cross bar. A sliding motion may be very intuitive for the user. In particular, a sliding motion may provide a guide for the attachment of the adapter. For example, the adapter may be in contact with the load connecting member and/or the cross bar during the sliding motion. The sliding motion in a direction along a longitudinal extension may further improve the intuitive use of the wheel holder. In particular, the user may already slide the load connecting member and/or the adapter along the cross bar for positional adjustment. Further details, advantages and embodiments of a wheel holder with the above-described adapter will be described below in conjunction with the load carrier attachment device according to the third aspect of the disclosure. Described embodiments and expedient developments of the load carrier attachment device according to the third aspect therefore also constitute embodiments and expedient developments of the wheel holder according to the first aspect and vice-versa.

According to an embodiment of the wheel holder, the wheel holder comprises a lock system for an anti-theft function, which is adjustable between a locked state, in which the wheel is locked to the wheel holding portion and the load connecting portion is locked to the load carrier, and an unlocked state by a sliding motion. By locking the wheel to the wheel holding portion, the wheel holding portion is preferably also locked to the load connecting portion. Preferably, the lock system is configured to lock the wheel holding member to the load connecting portion, either directly, preferably without requiring a wheel attached to the wheel holding member, or indirectly via the wheel. The sliding motion is intuitive and results in a compact wheel holder with a robust lock system. In particular, as compared to a lever-type lock system, a sliding motion type lock system is very difficult to pry open, for example with a crowbar. Preferably, the sliding motion is a translatory and/or rotational sliding motion. Further details, advantages and embodiments of a wheel holder with the above-described anti-theft system will be described below in conjunction with the load carrier attachment device according to the fifth aspect of the disclosure. Described embodiments and expedient developments of the load carrier attachment device according to the fifth aspect therefore also constitute embodiments and expedient developments of the wheel holder according to the first aspect and vice-versa.

A second aspect relates to a method of mounting a wheel, preferably a bike front wheel, to a load carrier of a vehicle, preferably using a wheel holder according to the first aspect. The method comprises the step of attaching the wheel to a wheel holding member. The method comprises the subsequent step of attaching the wheel holding member to a load connecting portion provided at the load carrier of the vehicle. Previous to the attachment of the wheel holding member, the load connecting portion may be attached to the load carrier of the vehicle. Such a method allows for a simple attachment of the wheel to the wheel holding member independently of the mounting position of the load connecting portion. Subsequent attachment of the wheel holding member to the load connecting portion may be facilitated by the above-described docking device.

A third aspect relates to a load carrier attachment device, in particular for a vehicle, with a load connecting member, the load connecting member preferably being configured to be mounted to a first cross-sectional type of cross bar. The vehicle may be a motor vehicle, e.g. a car, van, RV, caravan or truck. It is also possible that the wheel holder is attachable, e.g. via a load carrier, to the bed of a pickup truck. The vehicle may also be a ship or any other type of vehicle. The cross bar may be a part of a load carrier of the vehicle. The cross-sectional type may relate to the shape of a cross section of the cross bar. For example, the first cross-sectional type of the cross bar may have a round, e.g. a wing shaped cross-section, with the cross-section preferably being taken perpendicular to the cross bar's longitudinal extension. Preferably, the cross bar extends in the left-right direction of the vehicle when being mounted thereto in its intended fashion. A load carrier allows for transportation of additional loads, such as sport equipment, on the rooftop and/or at a back lid of the motor vehicle. The load carrier attachment device may also allow for attachment of a load to the vehicle without an additional load carrier. For example, the load carrier attachment device may be configured as a roof box. However, in all configurations, the load carrier attachment device is configured to attach a load to preferably a vehicle.

The load carrier attachment device further comprises an adapter. The load connecting member is preferably configured to be mounted to a different, second cross-sectional type of cross bar, via the adapter. For example, the second cross-sectional type of cross bar may have a rectangular cross-sectional shape, e.g. a squared shape, and/or a cross-sectional shape with a plurality of corners. The load carrier attachment device is configured for a releasable attachment of the adapter to the load connecting member by a sliding motion, preferably in a direction along a longitudinal extension of the cross bar. A sliding motion may be very intuitive for the user. In particular, a sliding motion may provide a guide for the attachment of the adapter. For example, the adapter may be in contact with the load connecting member and/or the cross bar during the sliding motion. The sliding motion in a direction along a longitudinal extension may further improve the intuitive use of the load carrier attachment device. In particular, the user may slide the load connecting member and/or the adapter along the cross bar for positional adjustment.

According to an embodiment of the load carrier attachment device, the load carrier attachment device is configured to self-engagingly fix the adapter to the load connecting member by the sliding motion, preferably with a snap-on connection. The fixation may prevent accidental detachment of the adapter. In particular, the fixation may hold the adapter in place relative to the load connecting member. Due to the self-engagement, the adapter may be fixed to the load connecting member by the sliding motion without requiring further manual and/or additional engagement of the fixation. The attachment of the adapter may therefore be secure and comfortable. A snap-on connection may comprise a deflectable element, such as a cantilever, that engages a corresponding protrusion, such as a ledge, step or undercut, in a form-fitting manner, potentially with an additional frictional fit. The snap-on connection is simple to design and cost-effective to manufacture. Further, users are usually well versed in the use of snap-on connections, further facilitating use of the load carrier attachment device. The fixation of the adapter to the load connecting member may also provide the benefit of preventing relative motion between the adapter and the load connecting member, in particular resulting in a detachment, when changing the position of the load connecting member on the cross bar with an attached adapter.

According to an embodiment of the load carrier attachment device, the adapter and/or the load connecting member comprises at least one latching element, which is deflected against a biasing force by the sliding motion. For example, the latching element may be configured as a cantilever with a hook end that is deflected during attachment of the adapter and hooks into a complementary recess once the adapter has reached its attached position. The biasing force may be generated by the latching member itself, e.g. by an elastic deformation thereof, and/or by a separate biasing means, e.g. a spring.

According to an embodiment of the load carrier attachment device, the load carrier attachment device comprises a release member configured for disengaging the fixation of the adapter and the load connecting member. Such a release member allows for a simple disengagement of the adapter. Preferably, the release member allows for a release of the adapter from the load connecting member even when attached to the cross bar. Preferably, the release member is configured as a button on the adapter or the load connecting member. In an embodiment, the release member is configured to move the latching member out of engagement with the adapter against the biasing force.

According to an embodiment of the load carrier attachment device, the adapter has a cross-sectional shape corresponding to the cross-sectional shape of the cross bar. In particular, the adapter may be configured to fit to a part of an outside circumference of the cross bar. For example, the adapter may have an U-shaped cross-sectional shape for at least partially accommodating a rectangular, e.g. squared, cross bar therein. For example, the cross-section of the adapter may be taken perpendicular to a longitudinal extension that aligns with a longitudinal extension of the cross bar when being mounted thereto.

According to an embodiment of the load carrier attachment device, an outer wall of the adapter is aligned with an outer wall of the load connecting member when the adapter is attached to the load connecting member in its intended fashion. The adapter and/or the load connecting member may comprise an end-stop and/or a guide rail that defines an attached position of the adapter, in particular with the aligned outer walls. The aligned outer walls may indicate to the user when the adapter is correctly attached to the load connecting member, thus facilitating correct mounting of the adapter. In particular, said position may indicate that the fixation has successfully self-engaged. The attachment position with aligned outer walls may also prevent the user from forcefully sliding the adapter too far, which would possibly damage parts of the load carrier attachment device. Accordingly, the adapter and/or the load connecting member may be designed less robust to outside forces, possibly saving weight and costs. Similarly, the attachment position with the aligned outer walls may prevent the user from not sliding the adapter far enough, which may otherwise result in unwanted disengagement of the adapter during use of the load carrier attachment device. Alignment of two walls may be defined as two adjacent edges essentially being arranged in the same plane. Alignment of two walls may also be defined as two surfaces of the walls being aligned without a step in between and/or as essentially forming a common plane. There may be a gap present between the two walls although they are situated in the same plane. An outer wall may be a wall that comprises at least one exterior surface.

In another embodiment of the load carrier attachment device, an outer wall of the adapter is aligned with an outer wall of the load connecting member when the adapter is in an engagement position with the load connecting member. The engagement position may be defined as the position before the sliding motion for the attachment of the adapter. Preferably, the adapter is already contacted to the load connecting member in the engagement position. In particular, the adapter may be partially arranged in a recess of the load connecting member and/or in contact with and/or arranged adjacent to a guide member of the load connecting member in the engagement position of the adapter. Preferably, the adapter may be moved from the engagement position to the attached position only by a translatory sliding motion in a single direction, in particular without requiring any pivoting movement and/or direction change. It is easy for the user to engage the adapter to the load connecting member for attachment due to the alignment of the outer walls in the engagement position. Preferably, the walls aligned in the engagement position are opposite to the walls aligned in the attached position.

According to an embodiment of the load carrier attachment device, the adapter and/or the load connecting member comprises at least one guide member, in particular a guide rail, for guiding the sliding motion between the adapter and the load connecting member. The guide member may prevent unwanted and/or wrong attachment movements of the adapter. A guide rail may also serve to hold the adapter in the attached position, for example due to an undercut. The guide rail may be integrally formed on the adapter and/or the load connecting member, for example in an injection molding process.

According to an embodiment of the load carrier attachment device, the load connecting member comprises a fastening device for fastening the load connecting member to the cross bar in a desired position. For example, the load connecting member may be fastened into place on the cross bar by means of a screw, clamp and/or strap. Fastening the load connecting member to the cross bar in the desired position prevents further relative movement between the load connecting member and the cross bar. The fastening in the desired position may also be referred to as a fixation. Preferably, the fastening device is configured to fix the adapter to the cross bar when attached to the load connecting member. With such a design, the adapter may be fixed in its attached position without requiring an additional fixation, such as a self-engaging snap-on connection. In addition, a user does not need to engage an additional fixation to fix the adapter to the load connecting member.

According to an embodiment of the load carrier attachment device, the fastening device comprises a strap for wrapping around the cross bar and a tightening element for tightening the strap around the cross bar to fasten the load connecting member to the cross bar. The strap may be a flexible fixation means that is compatible with many differently shaped cross bars, such as a rectangular and wing-shaped cross bar. Tightening of the strap for fastening the load connecting member is intuitive. Further, tightening allows for a fastening to cross bars with a wide range of diameters. The strap may, for example, be formed from a textile and/or plastic material, optionally comprising a reinforcement such as a wire.

According to an embodiment of the load carrier attachment device, the strap is configured for wrapping around the adapter when attached to the load connecting member, in particular with the load carrier attachment device mounted to the cross bar. The strap may thus tighten the adapter against the cross bar and/or the adapter against the load connecting member, in particular with the cross bar arranged in between the adapter and the load connecting member. Preferably, the adapter has an engagement opening allowing the strap to engage with the cross bar when being wrapped around the adapter. This allows the strap to create additional fixation forces for improved strength of the attachment to the cross bar. The engagement opening may also allow the strap to engage the adapter at a side wall in a sliding direction, in particular a detachment direction of the adapter from the load connecting member, thus preventing a detachment of the adapter by the sliding motion.

According to an embodiment of the load carrier attachment device, the load connecting member comprises a cross bar engagement portion having a profile adapted to the contour of the cross bar for reliable engagement. In particular, the profile of the cross bar engagement portion may be configured to prevent a rotation of the load connecting member around the longitudinal axis of the cross bar. Preferably, the profile is adapted to the wing shape contour of a cross bar. Preferably, the load connecting member has a load connection portion opposite to the cross bar engagement portion. The load connection portion may be configured for the attachment of a load holding member, such as a wheel holding member of the wheel holder according to the first aspect. Accordingly, the load connection portion may be configured as part of the docking device of the wheel holder according to the first aspect. Alternatively or additionally, the load connection portion may also be configured to directly hold a load, such as a wheel.

According to an embodiment of the load carrier attachment device, the guide member is integrated into the cross bar engagement portion of the load connecting member to not protrude from the cross bar engagement portion. Such a design may prevent damaging of the guide member during attachment of the load connecting member to the cross bar, in particular with no attached adapter. Further, with such a design, the guide member will not impede attachment of the load connecting member. Preferably, the guide member is arranged in the cross bar engagement portion and/or is recessed from an engagement surface of the cross bar engagement portion and/or is not contacting the cross bar when the load connecting member is mounted thereto in its intended fashion. An engagement surface of the cross bar engagement portion may be a surface that is at least partially in contact with the cross bar when the load connecting member is mounted thereto in its intended fashion.

According to an embodiment of the load carrier attachment device, the load carrier attachment device is configured as a wheel holder, preferably a bike front wheel holder, comprising a wheel holding member. The wheel holder further comprises a docking device configured for releasable attachment of the wheel holding member to the load connecting member to allow for attachment of a wheel to the wheel holding member at a location remote from the load connecting member. The load carrier attachment device may be configured as a wheel holder according to the first aspect of the disclosure. Described embodiments and expedient developments of the wheel holder according to the first aspect therefore also constitute embodiments and expedient developments of the load carrier attachment device according to the third aspect and vice-versa.

According to an embodiment of the load carrier attachment device, the load carrier attachment device comprises a lock system for an anti-theft function, which is adjustable between a locked state, in which the load is locked to load connecting member, and the load connecting member is locked to the load carrier, and an unlocked state by a sliding motion. The sliding motion is intuitive and results in a compact load carrier attachment device with a robust lock system. In particular, as compared to a lever-type lock system, a sliding motion type lock system is very difficult to pry open, for example with a crowbar. Preferably, the sliding motion is a translatory and/or rotational sliding motion. The load carrier attachment device may be configured as a load carrier attachment device according to the fifth aspect of the disclosure. Further details, advantages and embodiments of the load carrier attachment device according to the fifth aspect will be described below. Described embodiments and expedient developments of the load carrier attachment device according to the fifth aspect therefore also constitute embodiments and expedient developments of the load carrier attachment device according to the third aspect and vice-versa.

A fourth aspect of the disclosure relates to a method of attaching a load carrier attachment device, preferably according to the third aspect, to a cross bar of a load carrier of a vehicle. The method may comprise the step of arranging an adapter of the load carrier attachment device on the cross bar, preferably on a bottom side of the cross bar. The top and bottom of the cross bar may be defined by a vertical direction when the cross bar is mounted to a vehicle in the intended fashion. The bottom side of the cross bar may face an exterior side of the vehicle, e.g. a roof of the vehicle, when the load carrier is mounted to the vehicle in the intended fashion. The method may further comprise the step of arranging a load connecting member on the cross bar, preferably on a top side of the cross bar. Either the adapter or the load connecting member may be arranged on the cross bar first. The method may further comprise the step of sliding the adapter and the load connecting member relatively to each other, preferably along the longitudinal direction of the cross bar, to attach the load connecting member to the cross bar via the adapter and/or to attach the adapter to the load connecting member. Afterwards, the load carrier attachment device may be fastened in place with a fastening device, in particular by attaching a free end of a strap attached with its other end, preferably permanently, to the load connecting member. For fastening, the strap may be tightened, in particular by shortening an effective length of the strap between the sections terminating at the load connecting member. Preferably, the strap engages both with the adapter and the cross bar.

A fifth aspect relates to a load carrier attachment device, which has an anti-theft function. The load carrier attachment device according to the fifth aspect may be configured as the load carrier attachment device according to the first and/or third aspect. The load carrier attachment device according to the fifth aspect is configured for releasable attachment to a load carrier of a vehicle and for releasable attachment of a load. The vehicle may be a motor vehicle, e.g. a car, van, RV, caravan or truck. It is also possible that the wheel holder is attachable, e.g. via a load carrier, to the bed of a pickup truck. The vehicle may also be a ship or any other type of vehicle. A load carrier allows for transportation of additional loads, such as sport equipment, on the rooftop and/or at a back lid of the motor vehicle. The load carrier may comprise a cross bar. Preferably, the cross bar extends in the left-right direction of the vehicle when being mounted thereto in its intended fashion.

The load carrier attachment device according to the fifth aspect comprises a lock system adjustable between a locked state, in which the load is locked to the load carrier attachment device and the load carrier attachment device is locked to the load carrier, and an unlocked state by a sliding motion. The sliding motion is intuitive and results in a compact load carrier attachment device with a robust lock system. In particular, as compared to a lever-type lock system, a sliding motion type lock system is very difficult to pry open, for example with a crowbar. Preferably, the sliding motion is a translatory and/or rotational sliding motion. A translatory movement may be a linear motion along a certain path, preferably a straight path. During a translatory movement, preferably all points of the moved object follow the same path, e.g. are moved the same distance in the same direction. A rotational movement may include a pivoting of the moved object around a pivot axis.

According to an embodiment of the load carrier attachment device, the lock system comprises a door element. The door element may be the element moved in the sliding motion for adjusting the state of the lock system. Preferably, the door element comprises a recess for engaging a lock element for locking the load to the load carrier attachment device. The lock element may be an element that prevents theft of the load in the locked state of the lock system, such as a wire threaded through a bike wheel. In the unlocked state, the lock element may be disengaged from the door element, allowing the load to be detached and/or taken away from the load carrier attachment device. A sliding motion of the door element may adjust the lock system between the unlocked state, in which the lock element may be removed from the recess of the door element, and the locked state, in which the lock element is locked in the recess of the door element.

According to an embodiment of the load carrier attachment device, the load carrier attachment device comprises a guide element, preferably a guide rail, for guiding the sliding motion of the door element. Guidance of the sliding motion may facilitate adjustment of the state of lock system and/or may harden the lock system against manipulation. Preferably, the guide element guides the sliding motion of the door in a direction essentially parallel to a longitudinal direction of the load carrier, such as a longitudinal extension of a cross bar, when the load carrier attachment device is attached to the load carrier, in particular a cross bar of the load carrier, in the intended fashion. Such a direction is intuitive for the user and facilitates lock system handling. Further, usually a load carrier attachment device extends further in the longitudinal direction of the cross bar than orthogonal thereto, thus providing more installation space for a lock system with a sliding motion for adjustment of the locking state.

According to an embodiment of the load carrier attachment device, the door element is integrated into the load carrier attachment device. Integration further hardens the lock against manipulation. Preferably, the door element is configured as an integrated corner piece of the load carrier attachment device. In the locked state, the door element is preferably flush with adjacent surfaces of the load carrier attachment device. This makes it difficult for a thief to force the door element out of its locked position.

According to an embodiment of the load carrier attachment device, the lock element has a first end, which is permanently attached to the load carrier attachment device, and a second end, which is engageable with the recess of the door element. Such a design allows for easily locking differently shaped and/or sized loads to the load carrier attachment device. Further, the permanently attached end of the lock element is also difficult to manipulate. The second end may be attachable to the load carrier attachment device with a form fit coupling. A form fit provides a secure and simple engagement. Preferably, the second end is formed as a flared base. For example, the flared base may be provided by a metal piece attached to a wire. The latter embodiment provides a lock system with a simple yet reliable locking configuration.

According to an embodiment of the load carrier attachment device, the lock element is a flexible element. The flexible element facilitates locking of differently shaped and sized loads. Preferably, the flexible element is a wire. A wire is cost effective and very resistant to being forced apart. The flexible element may be configured for tying the load to the load carrier attachment device. The lock element is preferably configured to extend between spokes of a bike wheel for tying the bike wheel to the load carrier attachment device. The wire may be made of steel, any other type of metal or a different material.

Preferably, at least part of the wire element may be stowed away in an interior of the load carrier attachment device. For example, the wire element may be biased towards its stored position with a spring element. Preferably, in the stored position, only the flared base is accessible from the outside of the load carrier attachment device, in particular for pulling the wire element out of storage. The interior space for storage may be provided in a load holding member and/or a load connecting member, which are releasably attachable to each other via a docking device. According to an embodiment of the load carrier attachment device, the load carrier attachment device comprises a storing device for the lock element, preferably for storing the lock element in a coil-like shape, the storing device preferably being integrated into the load carrier attachment device. The storing device may comprise the interior space and/or the spring element. Storing the lock element may prevent damage to the load carrier attachment device and/or the motor vehicle when the lock is in its unlocked state or otherwise not in use.

According to an embodiment of the load carrier attachment device, the load carrier attachment device comprises a fastening device for fastening the load carrier attachment device to the load carrier. The fastening device allows to secure the load carrier attachment device in place on the cross bar. Further, the fastening device may be locked by the lock system, thus preventing unfastening and therefore unauthorized detachment of the load carrier attachment device from the load carrier for stealing the load and/or the load carrier attachment device.

According to an embodiment of the load carrier attachment device, the fastening device comprises a strap for wrapping around the cross bar and a tightening element for tightening the strap around the cross bar to fasten the load carrier attachment device to the cross bar. The strap may be a flexible fixation means that is compatible with many differently shaped cross bars, such as a rectangular and wing-shaped cross. Fastening may not only prevent detachment of the load carrier attachment device from the cross bar but may also fix the load carrier attachment device into position on the cross bar. The tightening element may be configured to shorten the effective length of the strap, e.g. the distance between two sections of the strap terminating at the load carrier attachment device. For example, the tightening device may cause one end of the strap to be shifted into an entrance into the interior of the load carrier attachment device. Tightening of the strap for fastening the load carrier attachment device is intuitive. Further, tightening allows for a fastening to cross bars with a wide range of diameters. The strap may, for example, be formed from a textile and/or plastic material, optionally comprising a reinforcement such as a wire.

According to an embodiment of the load carrier attachment device, the lock system, preferably the door element, blocks movement of the tightening element in the locked state. Blocking movement in the locked state may prevent disengagement and/or unfastening of the fastening device, thus locking the load carrier attachment device to the load carrier. If the door element blocks movement of the tightening element, no additional locking elements for locking the load carrier attachment device to the load carrier may be necessary. Further, locking either the load to the load carrier attachment device or the load carrier attachment device to the load carrier also locks the other. This prevents the user from forgetting to lock one of the locks as always both locks are actuated simultaneously. The door element preferably comprises a blocking protrusion for engaging with the tightening element in the locked state to block movement thereof. A blocking protrusion is a simple means for blocking movement of the tightening element. Blocking movement of the tightening element in the locked state may be understood as limiting movement of the tightening element to such an extent that no significant adjustment of the fastening device, which would allow for a detachment of the load attachment device from the load carrier, is possible. However, although the tightening element is blocked, a slight but functionally insignificant movement may still be possible.

According to an embodiment of the load carrier attachment device, the lock system comprises a lock cylinder and a key for locking the door element to the load carrier attachment device in the locked state. In particular, the lock cylinder may be configured to prevent movement of the door element from its locked position to an unlocked position. The locked position of the door element may correspond to the locked state of the lock system and its unlocked position to the unlocked state of the lock system. The lock cylinder provides a lock system with a simple and robust configuration.

According to an embodiment of the load carrier attachment device, the load carrier attachment device is configured as a wheel holder, preferably a bike front wheel holder. In particular, the load carrier attachment device may be configured as a wheel holder according to the first aspect of the disclosure. The wheel holder may comprise a load connecting member, which is releasably attachable to a load carrier, and a wheel holding member, wherein the wheel holder comprises a docking device configured for releasable attachment of the wheel holding member to the load connecting member to allow for attachment of a wheel to the wheel holding member at a location remote from the load connecting member. The lock system is preferably configured to lock the wheel to the load connecting member and/or the wheel holding member. The lock system is preferably configured to lock the load connecting member and/or the wheel holding member to the load carrier, in particular the cross bar of the load carrier. Described embodiments and expedient developments of the wheel holder according to the first aspect also constitute embodiments and expedient developments of the load carrier attachment device according to the fifth aspect and vice-versa.

According to an embodiment of the load carrier attachment device, the load carrier attachment device is configured to be releasably mounted to a first cross-sectional type of cross bar, preferably having a wing shape. Furthermore, the load carrier attachment device may comprise an adapter and may be configured to be mounted to a different, second cross-sectional type of cross bar, preferably having a rectangular shape, via the adapter. The load carrier attachment device is preferably configured for a releasable attachment to the adapter by a sliding motion, preferably in a direction along a longitudinal extension of the cross bar. The load carrier attachment device preferably comprises a load connecting member configured to be mounted to a first cross-sectional type of cross bar. The load carrier attachment device is preferably configured for attachment of the adapter to the load connecting member with the sliding motion. The sliding motion of the adapter relative to the load connecting member for its attachment is preferably parallel to the sliding motion for adjustment of the lock system. This may further facilitate operation of the load carrier attachment device for the user. In an embodiment, the lock system may be configured to lock the adapter to the load carrier attachment device, in particular with the same sliding motion, optionally of the same sliding element, as for locking other elements and/or the load. For example, the adapter may be in contact with the load connecting member and/or the cross bar during the sliding motion. Described embodiments and expedient developments of the load carrier attachment device according to the third aspect also constitute embodiments and expedient developments of the wheel holder according to the fifth aspect and vice-versa.

A sixth aspect relates to a method of locking a load to a load carrier attachment device, preferably according to the fifth aspect, and of locking the load carrier attachment device to a load carrier. The method may comprise the step of transferring a door element of a lock system of the load carrier attachment device to an unlocked state. The unlocked state may correspond to an unlocked position of the door element relative to other parts of the load carrier attachment device. The method may further comprise the step of engaging a lock element for fixing the load to the load carrier attachment device with the door element. For example, the lock element may be passed through an opening in the load, such as between two adjacent spokes of a bike wheel. The method may further comprise the step of transferring the door element from the unlocked to the locked state by a sliding motion, thereby locking the load to the load carrier attachment device and the load carrier attachment device to the load carrier.

Further details, advantages and embodiments are defined by the following item list, noting that the features and embodiments of item B may constitute features of item C and the above described embodiments of the first to sixth aspects of the disclosure and vice versa. The items are provided with reference signs in parenthesis for ease of reference to the figures, which shall not be construed as limiting their subject-matter:

Items B

B1. Load carrier attachment device (1) with a load connecting member (2) preferably configured to be mounted to a first cross-sectional type of cross bar (4), preferably with a wing shape, and an adapter (50), wherein the load connecting member (2) is preferably configured to be mounted to a different, second cross-sectional type of cross bar (4.1), preferably with a rectangular shape, via the adapter (50), wherein the load carrier attachment device (1) is configured for a releasable attachment of the adapter (50) to the load connecting member (2) by a sliding motion, preferably in a direction along a longitudinal extension of the cross bar (4; 4.1).

B2. Load carrier attachment device (1) according to item B1, wherein the load carrier attachment device (1) is configured to self-engagingly fix the adapter (50) to the load connecting member (2) by the sliding motion, preferably with a snap-on connection.

B3. Load carrier attachment device (1) according to item B2, wherein the adapter (50) and/or the load connecting member (2) comprises at least one latching element, which is deflected against a biasing force by the sliding motion.

B4. Load carrier attachment device (1) according to item B2 or B3, comprising a release member configured for disengaging the fixation of the adapter (50) and the load connecting member (2), the release member preferably being configured as a button on the adapter (50) or the load connecting member (2).

B5. Load carrier attachment device (1) according to any of the preceding items B, wherein the adapter (50) has a cross-sectional shape corresponding to the cross-sectional shape of the cross bar (4; 4.1), preferably an U-shaped cross-sectional shape for accommodating a rectangular cross bar (4.1) therein.

B6. Load carrier attachment device (1) according to any of the preceding items B, wherein an outer wall of the adapter (50) is aligned with an outer wall of the load connecting member (2) when the adapter (50) is attached to the load connecting member (2) in its intended fashion.

B7. Load carrier attachment device (1) according to any of the preceding items B, wherein the adapter (50) and/or the load connecting member (2) comprises at least one guide member (44.1, 44.2; 45.1, 45.2), in particular a guide rail, for guiding the sliding motion in between the adapter (50) and the load connecting member (2).

B8. Load carrier attachment device (1) according to any of the preceding items B, wherein the load connecting member (2) comprises a fastening device (27, 28, 32, 33, 35) for fastening the load connecting member (2) to the cross bar (4; 4.1) in a desired position, wherein the fastening device (27, 28, 32, 33, 35) is preferably configured to fix the adapter (50) to the cross bar (4; 4.1) when attached to the load connecting member (2).

B9. Load carrier attachment device (1) according to item B8, wherein the fastening device comprises a strap (27) for wrapping around the cross bar (4; 4.1) and a tightening element (35) for tightening the strap (27) around the cross bar (4; 4.1) to fasten the load connecting member (2) to the cross bar (4; 4.1).

B10. Load carrier attachment device (1) according to item B9, wherein the strap (27) is configured for wrapping around the adapter (50) when attached to the load connecting member (2), the adapter (50) preferably having an engagement opening (53) allowing the strap (27) to engage with the cross bar (4; 4.1) when being wrapped around the adapter (50).

B11. Load carrier attachment device (1) according to any one of the preceding items B, wherein the load connecting member (2) comprises a cross bar engagement portion (30) having a profile adapted to the contour of the cross bar (4), preferably to the wing shape contour of the cross bar (4), for reliable engagement, the load connecting member (2) preferably further having a load connection portion opposite to the cross bar engagement portion (30).

B12. Load carrier attachment device (1) according to items B7 and B11, wherein the guide member (44.1, 44.2; 45.1, 45.2) is integrated into the cross bar engagement portion (30) of the load connecting member (2) to not protrude from the cross bar engagement portion (30).

B13. Load carrier attachment device (1) according to any one of the preceding items B, wherein the load carrier attachment device (1) is configured as a wheel holder, preferably a bike front wheel holder, comprising a wheel holding member (3), wherein the wheel holder (1) comprises a docking device (100) configured for releasable attachment of the wheel holding member (3) to the load connecting member (2) to allow for attachment of a wheel (5) to the wheel holding member (3) at a location remote from the load connecting member (2).

B14. Load carrier attachment device (1) according to item B13, the wheel holder (1) comprising a lock system (101) for an anti-theft function, which is adjustable between a locked state, in which the wheel (5) is locked to the wheel holding portion (3) and the load connecting portion (2) is locked to the load carrier (4), and an unlocked state by a sliding motion.

B15. Method of attaching a load carrier attachment device (1), preferably according to any one of the preceding items B, to a cross bar (4.1) of a load carrier of a vehicle, comprising the steps of:
  arranging an adapter (50) of the load carrier attachment device (1) on the cross bar (4.1), preferably on a bottom side of the cross bar (4.1);
  arranging a load connecting member (2) on the cross bar (4.1), preferably on a top side of the cross bar (4.1); and
  sliding the adapter (50) and the load connecting member (2) relatively to each other, preferably along the longitudinal direction of the cross bar (4.1), to attach the load connecting member (2) to the cross bar (4.1) via the adapter (50).

Items C

C1. Load carrier attachment device (1) with an anti-theft function, the load carrier attachment device (1) being configured for releasable attachment to a load carrier (4) of a vehicle and for releasable attachment of a load (5), wherein the load carrier attachment device (1) comprises a lock system (101) adjustable between a locked state, in which the load (5) is locked to the load carrier attachment device (1) and the load carrier attachment device (1) is locked to the load carrier (4), and an unlocked state by a sliding motion, preferably a translatory and/or rotational sliding motion.

C2. Load carrier attachment device (1) according to item C1, the lock system (101) comprising a door element (74), which comprises a recess (76) for engaging a lock element (37, 38, 39) for locking the load (5) to the load carrier attachment device (1), wherein a sliding motion of the door element (74) adjusts the lock system (101) between the unlocked state, in which the lock element (37, 38, 39) may be removed from the recess (76) of the door element (74), and the locked state, in which the lock element (37, 38, 39) is locked in the recess (76) of the door element (74).

C3. Load carrier attachment device (1) according to item C2, wherein the load carrier attachment device (1) comprises a guide element (71, 72), preferably a guide rail, for guiding the sliding motion of the door element (74), preferably in a direction essentially parallel to a longitudinal direction of the load carrier (4; 4.1) when the load carrier attachment device (1) is attached to the load carrier (4; 4.1) in the intended fashion.

C4. Load carrier attachment device (1) according to item C2 or C3, wherein the door element (74) is integrated into the load carrier attachment device (1), preferably as an integrated corner piece, wherein the door element (74) is preferably flush with adjacent surfaces of the load carrier attachment device (1) in the locked state.

C5. Load carrier attachment device (1) according to one of items C2 to C4, wherein the lock element (37) has a first end (38), which is permanently attached to the load carrier attachment device (1), and a second end (39), which is engageable with the recess (76) of the door element (74).

C6. Load carrier attachment device (1) according to item C5, wherein the second end (39) is attachable to the load carrier attachment device (1) with a form fit coupling, the second end (39) preferably being formed as a flared base.

C7. Load carrier attachment device (1) according to any one of the preceding items C, wherein the lock element (37) is a flexible element, preferably a wire, for tying the load (5) to the load carrier attachment device (1), the lock element (37) preferably being configured to extend between spokes of a bike wheel (5) for tying the bike wheel (5) to the load carrier attachment device (1).

C8. Load carrier attachment device (1) according to item C7, further comprising a storing device for the lock element (37), preferably for storing the lock element in a coil-like shape, the storing device preferably being integrated into the load carrier attachment device (1).

C9. Load carrier attachment device (1) according to any of the preceding items C, comprising a fastening device (27, 28, 32, 33, 35) for fastening the load carrier attachment device (1) to the load carrier (4; 4.1).

C10. Load carrier attachment device (1) according item C9, wherein the fastening device comprises a strap (27) for wrapping around the cross bar (4; 4.1) and a tightening element (35) for tightening the strap (27) around the cross bar (4; 4.1) to fasten the load carrier attachment device (1) to the cross bar (4; 4.1).

C11. Load carrier attachment device (1) according item C10, wherein the lock system (101), preferably the door element (74), blocks movement of the tightening element (35) in the locked state, wherein the door element (74) preferably comprises a blocking protrusion (77) for engaging with the tightening element (35) in the locked state to block movement thereof.

C12. Load carrier attachment device (1) according to one of items C2 to C11, wherein the lock system (101) comprises a lock cylinder (78) and a key (79) for locking the door element (74) to the load carrier attachment device (1) in the locked state.

C13. Load carrier attachment device (1) according to any one of the preceding items C, wherein the load carrier attachment device (1) is configured as a wheel holder, preferably a bike front wheel holder, comprising a load connecting member (2), which is releasably attachable to a load carrier (4; 4.1), and a wheel holding member (3), wherein the wheel holder (1) comprises a docking device (100) configured for releasable attachment of the wheel holding member (3) to the load connecting member (2) to allow for attachment of a wheel (5) to the wheel holding member (3) at a location remote from the load connecting member (2).

C14. Load carrier attachment device (1) according to any one of the preceding items C, which is configured to be releasably mounted to a first cross-sectional type of cross bar (4), preferably having a wing shape, the load carrier attachment device (1) further comprising an adapter (50) and being configured to be mounted to a different, second cross-sectional type of cross bar (4.1), preferably having a rectangular shape, via the adapter (50), wherein the load carrier attachment device (1) is preferably configured for a releasable attachment to the adapter (50) by a sliding motion, preferably in a direction along a longitudinal extension of the cross bar (4.1).

C15. Method of locking a load (5) to a load carrier attachment device (1), preferably according to one of the preceding items C, and of locking the load carrier attachment device (1) to a load carrier (4; 4.1), comprising the steps:
  transferring a door element (74) of a lock system (101) of the load carrier attachment device (1) to an unlocked state;
  engaging a lock element (37) for fixing the load (5) to the load carrier attachment device (1) with the door element (74); and
  transferring the door element (74) from the unlocked to the locked state by a sliding motion, thereby locking the load (5) to the load carrier attachment device (1) and the load carrier attachment device (1) to the load carrier (4; 4.1).

Items D

D1. Wheel holder (1) for a vehicle, preferably bike front wheel holder, with a load connecting portion (2), which is preferably releasably attachable to a load carrier (4), and a wheel holding member (3), wherein the wheel holder (1) comprises a docking device (100) configured for releasable attachment of the wheel holding member (3) to the load connecting portion (2) to allow for attachment of a wheel (5) to the wheel holding member (3) at a location remote from the load connecting portion (2).

D2. Wheel holder (1) according to item D1, wherein the docking device (100) is configured for releasable attachment of the wheel holding member (3) to the load connecting portion (2) in a first predetermined attachment position, preferably in the first and in a second predetermined attachment position, more preferably only in the first and second predetermined attachment positions.

D3. Wheel holder (1) according to item D2, wherein the wheel holding member (3) extends essentially upwards in an upright position and/or at a predetermined angle from the vertical, preferably at 5° to 20° backwards from a vertical position, more preferably 15°, in the first predetermined attachment position and/or the wheel holding member (3) extends essentially horizontally in the second predetermined attachment position when the wheel holder (1) is attached to the load carrier (4) and the load carrier (4) to the vehicle in the intended fashion.

D4. Wheel holder (1) according to item D2 or D3, wherein the wheel holding member (3) may only be adjusted between the first and second predetermined attachment positions by releasing the wheel holding member (3) from the load connecting portion (2).

D5. Wheel holder (1) according to any one of the preceding items D, wherein the docking device (100) comprises at least one male member (14; 14.1) and at least one complementary female member (40; 41), which define the first and/or second predetermined attachment position when engaged with each other.

D6. Wheel holder (1) according to item 5, wherein the at least one male member (14; 14.1) is configured as a guiding protrusion and is preferably provided on the wheel holding member (3), and wherein the female member (40; 41) is configured as a trough shaped recess and is preferably provided on the load connecting portion (2).

D7. Wheel holder (1) according to any one of the preceding item D2 to D6, wherein an essentially flat surface of the wheel holding member (3) and a protrusion (62) of the load connecting portion (2) define the predetermined second attachment position.

D8. Wheel holder (1) according to any one of the preceding items D, wherein the docking device (100) comprises a fixation device (15, 16, 17, 21, 22, 23, 24) configured to fix the wheel holding member (3) to the load connecting portion (2) in the first and/or second predetermined attachment position, the fixation device (15, 16, 17, 21, 22, 23, 24) preferably being configured as a clamping device.

D9. Wheel holder (1) according to item D8, wherein the fixation device comprises a clamping bolt (15), preferably with an actuation element (16) at a first and/or a flared base (17) at the opposite second end, the clamping bolt (15) preferably being arranged at the wheel holding member (3), and/or wherein the fixation device comprises at least one wall (21; 22) with a bearing recess (23; 24) for accommodating the clamping bolt (15), which is preferably provided at the load connecting portion (2), the wall (21; 22) preferably comprising teeth for preventing a rotation of the wheel holding member (3) and the load connecting portion (2) with respect to each other, the fixation device preferably comprising two walls (21, 22) each having a bearing recess (23, 24) for accommodating the clamping bolt (15), wherein the wheel holding member (3) may be clamped in between said two walls (21, 22) via the clamping bolt (15) to fix the wheel holding member (3) to the load connecting portion (2).

D10. Wheel holder (1) according to item D8 or D9, wherein the fixation device is configured for a snap-on connection of the wheel holding member (3) to the load connecting portion (2), the fixation device preferably comprising a quick-release mechanism configured for disengaging the snap-on connection.

D11. Wheel holder (1) according to any one of the preceding items D, wherein the docking device (100) is configured to hold the wheel holding member (3) in place when arranged on the load connecting portion (2) without the wheel holding member (3) being fixed to the load connecting portion (2), preferably in the first and/or second predetermined attachment position.

D12. Wheel holder (1) according to any one of the preceding items D, wherein the wheel holding member (3) is configured as an essentially U-shaped element (6), preferably with a bottom (12) of the U-shaped element (6) being configured for attachment to the load connecting portion (2), and/or preferably with each leg (8, 9) of the U-shaped element (6) being configured for attachment of the wheel (5), and/or preferably with each leg (8, 9) of the U-shaped element (6) being configured for receiving an end of an axle (7) of the wheel (5), preferably wherein the wheel holder comprises an adapter for attachment of a bike wheel with a through axle configuration, in particular configured as a sleeve, and/or is configured for attachment of a wheel with an axle comprising a quick-release lever.

D13. Wheel holder (1) according to any one of the preceding items D, wherein the load connecting portion is configured as a load connecting member (2), which is configured to be releasably mounted to a first cross-sectional type of cross bar (4), preferably having a wing shape, the wheel holder (1) further comprising an adapter (50) and being configured to be mounted to a different, second cross-sectional type of cross bar (4.1), preferably having a rectangular shape, via the adapter (50), wherein the load connecting member (2) is preferably configured for a releasable attachment to the adapter (50) by a sliding motion, preferably in a direction along a longitudinal extension of the cross bar (4.1).

D14. Wheel holder (1) according to any one of the preceding items D, the wheel holder (1) comprising a lock system (101) for an anti-theft function, which is adjustable between a locked state, in which the wheel (5) is locked to the wheel holding portion (3) and the load connecting portion (2) is locked to the load carrier (4), and an unlocked state by a sliding motion.

D15. Method of mounting a wheel (5), preferably a bike front wheel, to a load carrier (4) of a vehicle, preferably using a wheel holder (1) according to one of the preceding items D, comprising the steps:
attaching the wheel (5) to a wheel holding member (3); and
subsequently attaching the wheel holding member (3) to a load connecting portion (2) provided at the load carrier (4) of the vehicle.

Other features of the present disclosure will be apparent from consideration of the information contained above as well as in or in combination with the following detailed description, drawings and claims. The present disclosure is illustrated by way of example, and not by way of limitation, in the figures of the accompanying drawings.

BRIEF DESCRIPTION OF FIGURES

FIG. 3 shows the wheel holding member of the wheel holder of FIG. 1 detached from the load connecting portion with an attached wheel in a schematic perspective view.

FIG. 4 shows the wheel holding member of FIG. 3 detached from the wheel in a schematic perspective view.

FIG. 5 shows the wheel holding member of FIG. 4 in a frontal schematic view.

FIG. 6 shows the wheel holding member of FIG. 4 in a first schematic side view.

FIG. 7 shows the wheel holding member of FIG. 4 in a second schematic side view opposite to the first schematic side view.

DETAILED DESCRIPTION OF EMBODIMENTS

Figure 1:
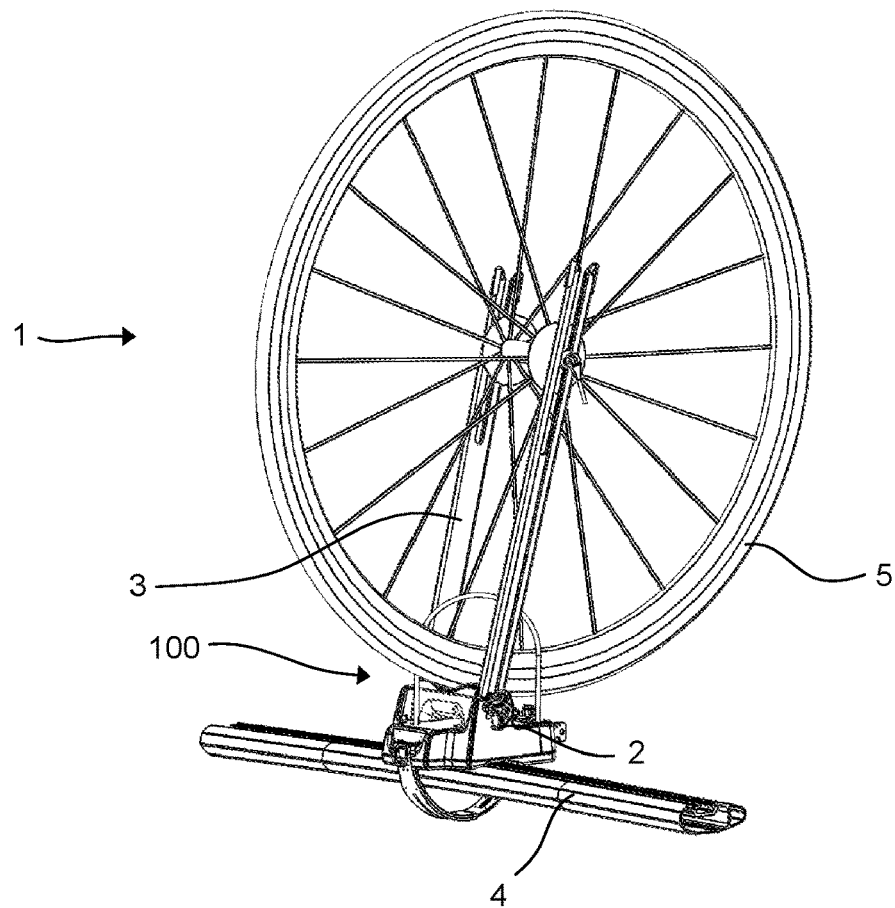
FIG. 1 shows a wheel holder for a vehicle according to a first embodiment comprising a wheel holding member in an upright position with an attached wheel and a load connecting portion attached to a cross bar of a load carrier in a schematic perspective view.

FIG. 1 shows a wheel holder 1 for a vehicle, e.g. a car. The wheel holder 1 constitutes a load carrier attachment device. The wheel holder 1 comprises a load connecting portion 2, which is, in the present embodiment, configured as a load connecting member 2 and is releasably attachable to a cross bar of a load carrier 4. In FIG. 1, the load connecting member 2 is attached to the cross bar 4 in its intended mounting position. The cross bar may, for example, extend in the left-right direction of the rooftop of the vehicle when it is mounted thereto in the intended fashion. The wheel holder 1 further comprises a wheel holding member 3 to which a bike wheel 5 may be releasably attached for purposes of transportation by the vehicle.

Figure 2:
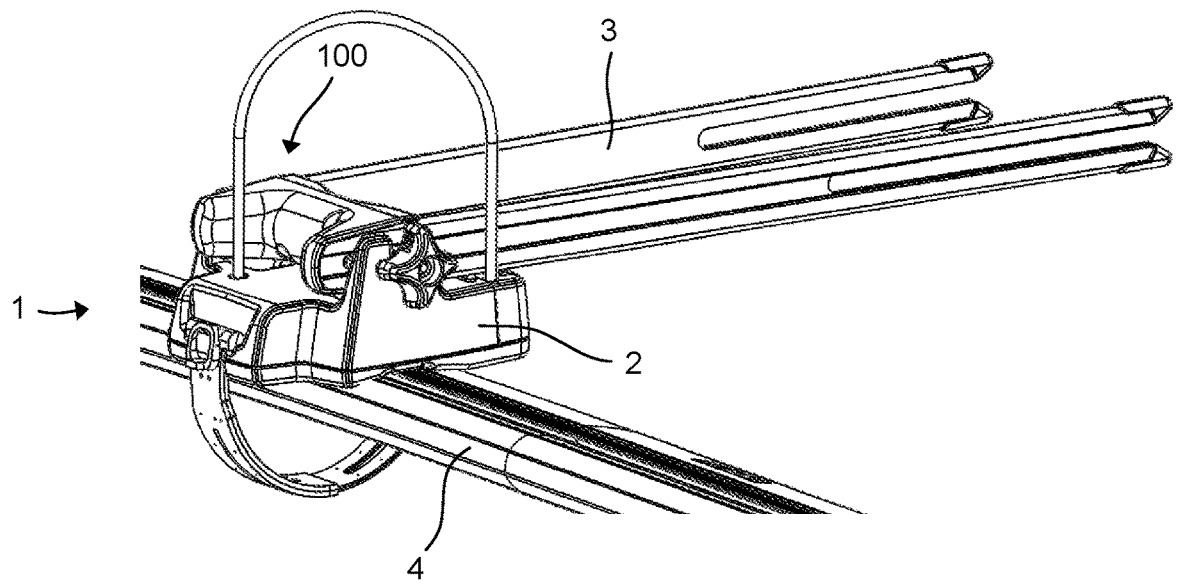
FIG. 2 shows the wheel holder of FIG. 1 with the wheel holding member in an essentially horizontal position in a schematic perspective view.

FIG. 1 shows the wheel holding member 3 in a first upright position constituting a first predetermined attachment position. In this first predetermined attachment position, the bike wheel 5 may be attached to the wheel holding member 3. The wheel holding member 3 is angled backwards by about 15° to the vertical to reduce drag and increase resistance to headwind. FIG. 2 shows the wheel holding member 3 in a second predetermined attachment position, in which the wheel holding member 3 is oriented essentially horizontally. In this second position, the wheel holding member 3 extends essentially parallel to an exterior of the vehicle, e.g. a roof of the vehicle, thereby further reducing drag and overall height. Attachment of the bike wheel 5 to the wheel holding member 3 is not intended in this second predetermined position.

The wheel holder 1 comprises a docking device 100 configured for releasable attachment of the wheel holding member 3 to the load connecting portion 2. The docking device 100 is formed by the wheel holding member 3 and the load connecting portion 2, as will be described in more detail below. FIG. 3 shows the wheel holding member 3 detached from the load connecting portion 2. Due to the detachment, the bike wheel 5 may be attached to the wheel holding member 3 at a location remote from the load connecting portion 2. In addition, orientation of the wheel holding member 3 may also be independent from the orientations of the load connecting portion 2 and the load carrier 4 when attaching the bike wheel 5 to the wheel holding member 3. As can be seen in FIGS. 3 and 4, the wheel holding member 3 may e.g. be arranged upside-down during attachment of the bike wheel 5, further simplifying attachment.

FIG. 4 illustrates the attachment of the bike wheel 5 to the wheel holding member 3. As derivable from FIGS. 5 to 7, the wheel holding member 3 comprise a substantially U-shaped member 6 with two legs 8, 9 and a bottom 12. The bottom 12 may be an injection molded plastic part, which allows to cost-effectively provide the bottom 12 with a more complex geometry. The elongated members forming the legs 8, 9 are preferably made from metal and exhibit slits 10, 11 extending in the legs 8, 9 towards the distal ends thereof. For mounting the bike wheel 5 to wheel holding member 3, an axle 7 of the wheel 5 is slid into slits 10 and 11 of each leg 8, 9 of the U-shaped member 6. The bike wheel 5 with the axle 7 sliding in the slits 10, 11 is moved downwards until an outer circumference of the wheel 5 contacts a wheel-facing surface 13 of the bottom 12 of the U-shaped element 6. The surface 13 may have a middle indentation for better receiving the bike wheel 5 and providing some side-stability to the wheel while being attached to the wheel holding member 3. The axle 7 is then tightened in this position while the contact between the wheel 5 and the surface 13 of the bottom 12 may prevent rotation of the wheel.

Figure 8:
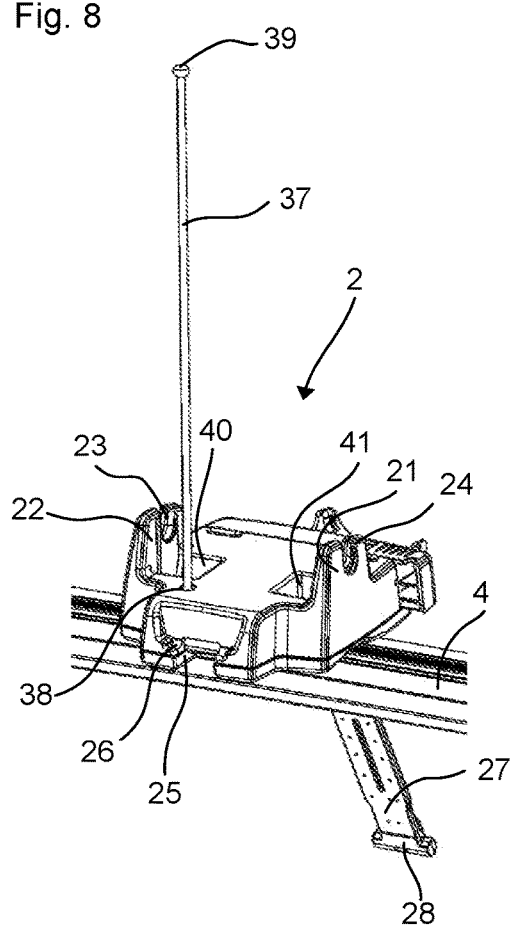
FIG. 8 shows the load connecting portion of the wheel holder of FIG. 1 unfastened to the cross bar with a fastening strap having a loose end and with a lock system in an unlocked state in schematic perspective view.
Figure 9:
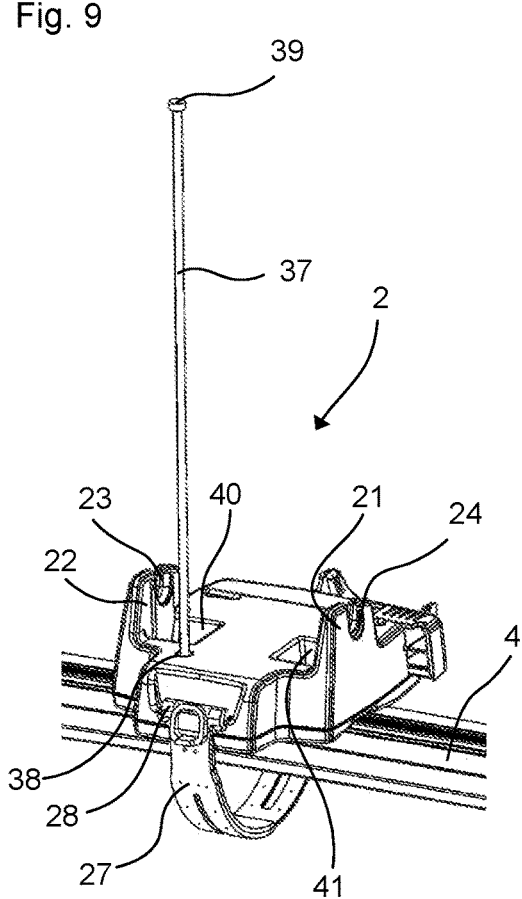
FIG. 9 shows the load connecting portion of FIG. 8 with the loose end of the strap now hooked to the load connecting portion in a schematic perspective view.
Figure 10:
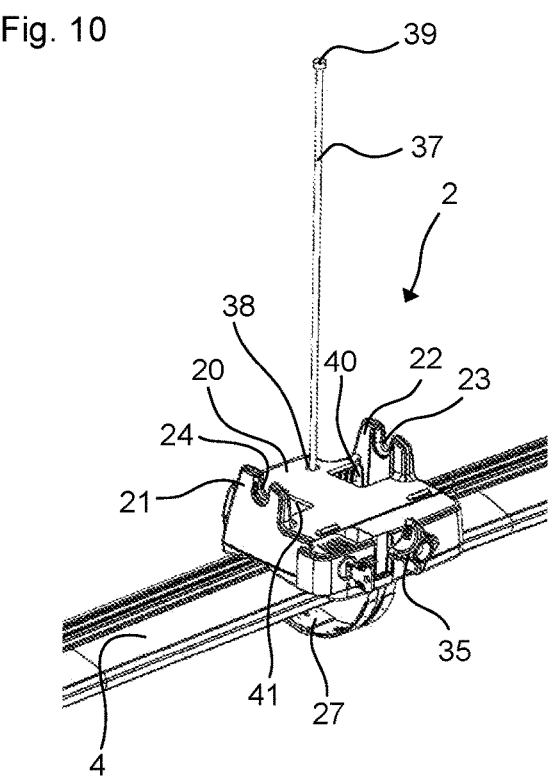
FIG. 10 shows the load connecting portion of FIG. 9 in another schematic perspective view.
Figure 23:
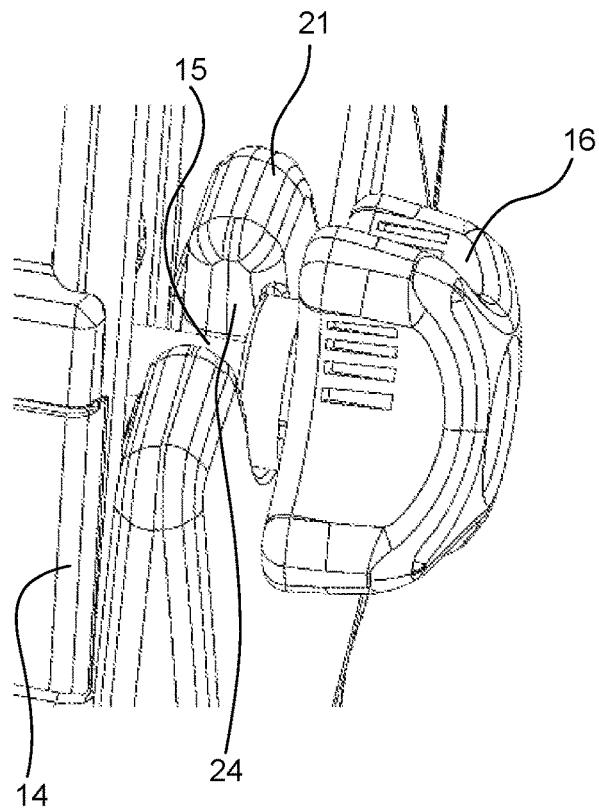
FIGS. 23 and 24 illustrate details of a docking device configured for releasable attachment of the wheel holding member to the load connecting portion in schematic perspective views.
Figure 24:
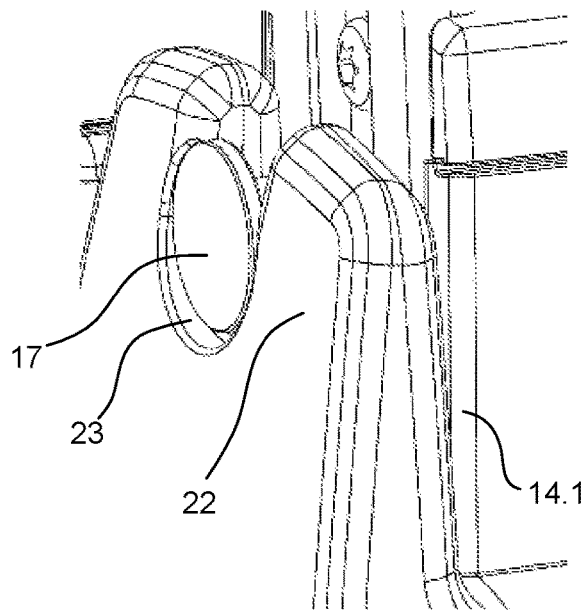

FIGS. 8 to 10 illustrate the load connecting portion 2 in more detail. The load connecting portion 2 comprises two protruding side walls 21, 22, each side wall 21, 22 being provided with a bearing recess 23, 24. When attaching the wheel holding member 3 to the load connecting portion 2, a clamping bolt 15 of the wheel holding member 3, which is arranged at the bottom 12 of the wheel holding member 3, is arranged with its respective ends in the bearing recesses 23, 24 of the load connecting portion 2, as can be seen in greater detail in FIGS. 23 and 24. At one end, the clamping bolt 15 is provided with an actuation element 16, e.g. in the form of a turning knob. At the other end, the clamping bolt 15 is provided with a flared base 17 that prevents the bolt 15 from sliding out of support in the bearing recess 23. The clamping bolt 15, the actuation element 16, the flared base 17 and the walls 21, 22 with the bearing recesses 23, 24 together form a fixation device configured for fixing the wheel holding member 3 to the load connecting portion 2. As derivable from FIGS. 23 and 24, for fixation, the side walls 21, 22 are urged inwards through the clamping bolt 15 with its actuation element 16 and its flared base 17 to engage with the outer walls of the legs 8, 9 of the U-shaped member 6, thereby effectuating a frictional fit between the wheel holding member 3 and the load connecting portion 2.

Figure 18:
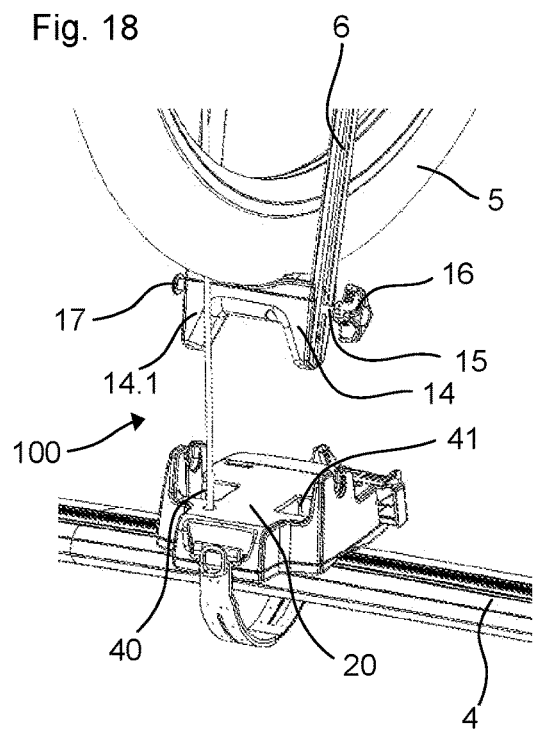
FIGS. 18 and 19 illustrate attachment of the wheel holding member to the load connecting portion in schematic perspective views.
Figure 19:
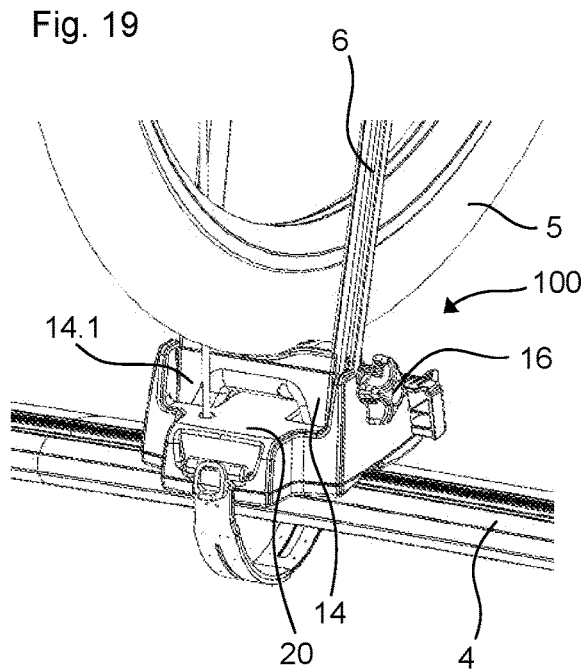
Figure 20:
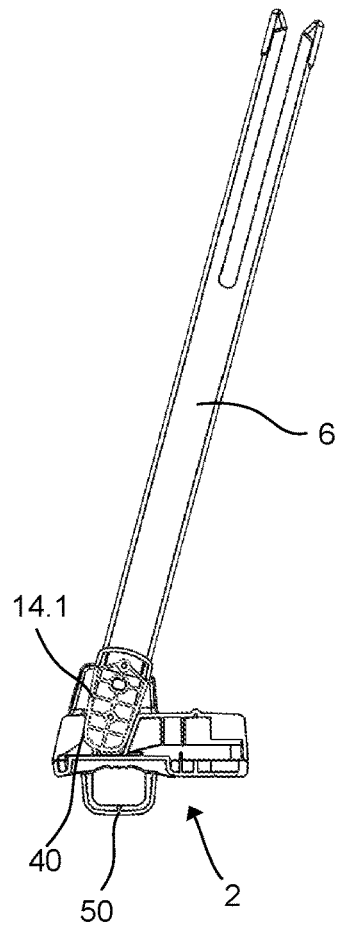
FIG. 20 shows the wheel holder of FIG. 1 in a sectional schematic side view.
Figure 21:
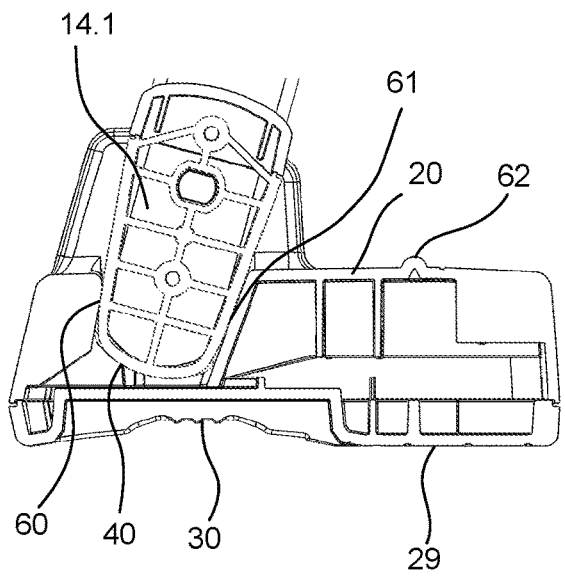
FIG. 21 shows part of the wheel holder of FIG. 20 in a sectional schematic side view.

At its end facing away from the bike wheel 5, the bottom 12 of the wheel holding member 3 is provided with two guiding protrusions 14 and 14.1, as e.g. illustrated in FIGS. 5 to 7. The load connecting portion 2 is provided with complementary trough shaped recesses 40, 41, which are respectively provided adjacent and inside of the side walls 21, 22, as e.g. shown in FIGS. 8 to 10. When attaching the wheel holding member 3 to the load connecting portion 2, the protrusions 14, 14.1 slide into the recesses 40, 41. This is illustrated in more detail in FIGS. 18 and 19. Due to the pairwise engagement of these complementary male members 14, 14.1 and female member 40, 41, the wheel holding member 3 is prevented from tilting in a left-right direction and from rotating relative to the load connecting portion 2 around a vertical axis. Furthermore, as can be seen in FIGS. 20 and 21, the frontside and the backside of the protrusions 14, 14.1 engage with those side walls 60, 61 of the recesses 40, 41, which face frontwards and backwards, respectively. The contact with the side walls 60, 61 prevents the wheel holding member 3 from tilting in a forward and backward direction, in particular in the direction of the second predetermined, essentially horizontal position. As such, the side walls 60, 61 may act as end-stops. Furthermore, the docking device 100 is configured in such a way that it may hold the wheel holding member 3 in its first predetermined position against gravity when the bike wheel 5 is attached to the wheel holding member 3 but the fixation device is not engaged and actuated, respectively. This state constitutes a holding state of the docking device 100. The recesses 40, 41 and the overall structure of the wheel holder 1 also prevent an attachment of the wheel holding member 3 to the load connecting portion 2 in a position between the first predetermined, upright position and the second predetermined, horizontal position. Further, the wheel holding member 3 may only be adjusted between its positions with a previous detachment from the load connecting portion 2.

Figure 22:
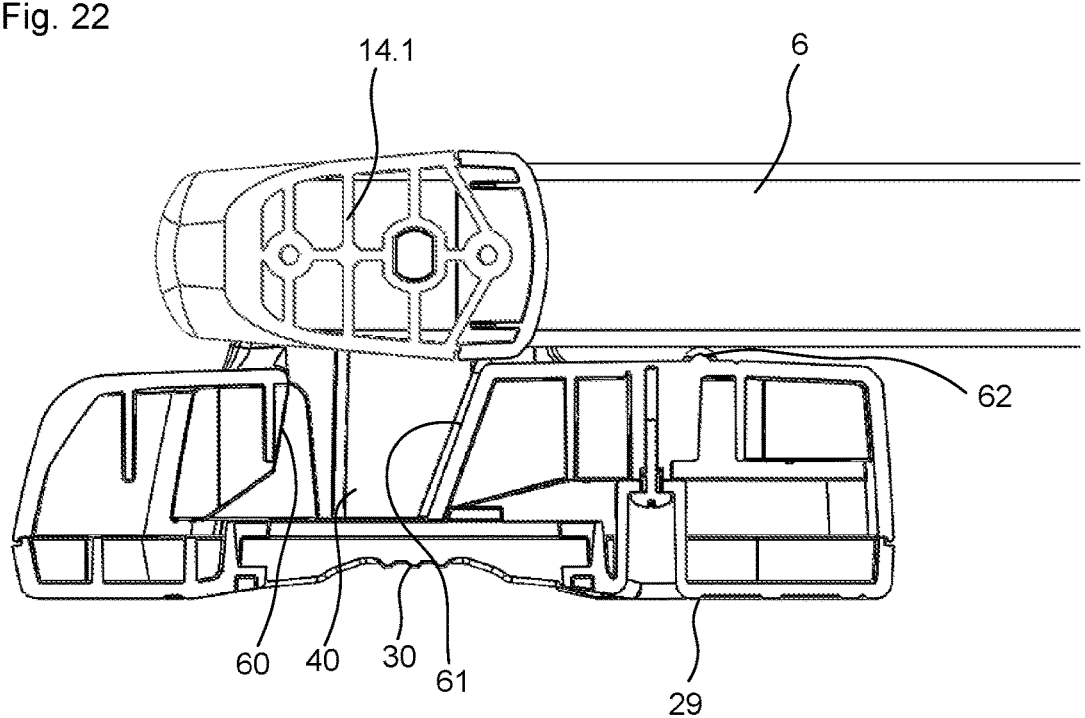
FIG. 22 shows part of the wheel holder of FIG. 2 in a sectional schematic side view.

FIG. 22 illustrates the wheel holder 1 with the wheel holding member 3 in the second predetermined, essentially horizontal position. In this second position, the wheel holding member 3 is only supported by the clamping bolt 15 engaged with the bearing recesses 23, 24 of the side walls 21, 22 and a protrusion 62 provided on the top surface of the load connecting portion 2. Specifically, the protrusion 62 is engaged with a flat side of each leg 8, 9 of the wheel holding member 3 in this second predetermined position. As can be seen in FIG. 22, the protrusions 14, 14.1 are not arranged in the recesses 40, 41 in the second position. However, in an alternative embodiment, the wheel holding member 3 may be provided with another set of protrusions that may be arranged in the recesses 40, 41 in this second predetermined position, allowing the wheel holding member 3 to be supported in position without engagement of the clamping bolt 15.

Figure 12:
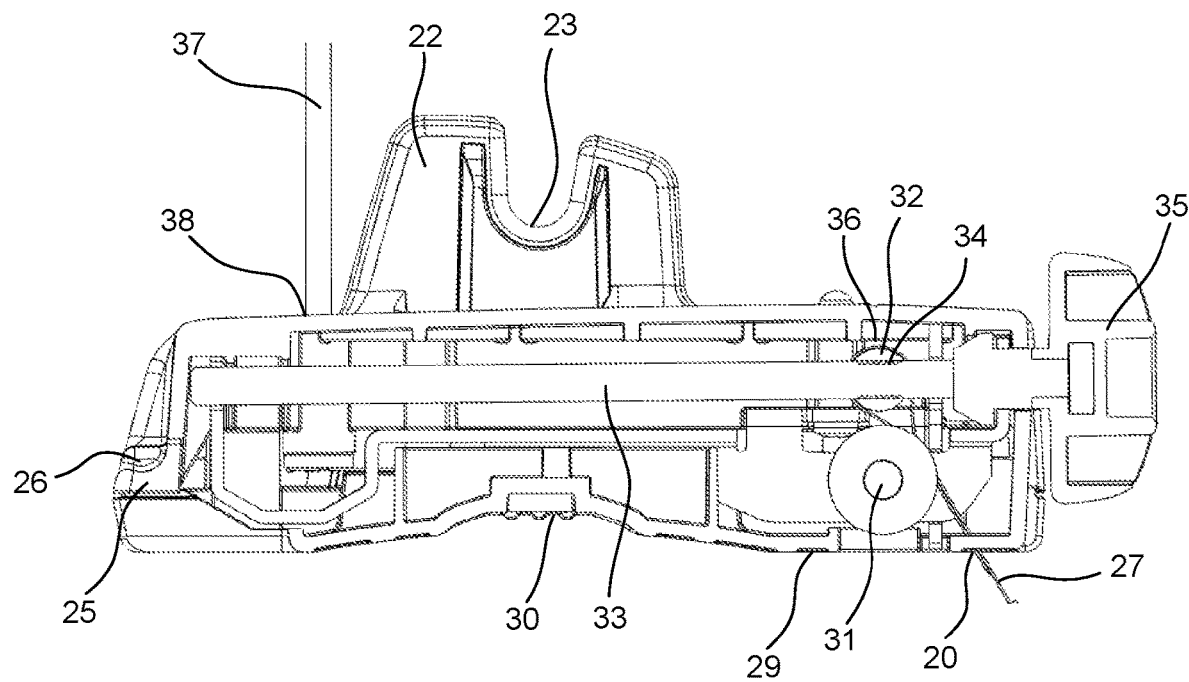
FIG. 12 shows the load connecting portion of FIG. 8 in a schematic sectional side view.
Figure 13:
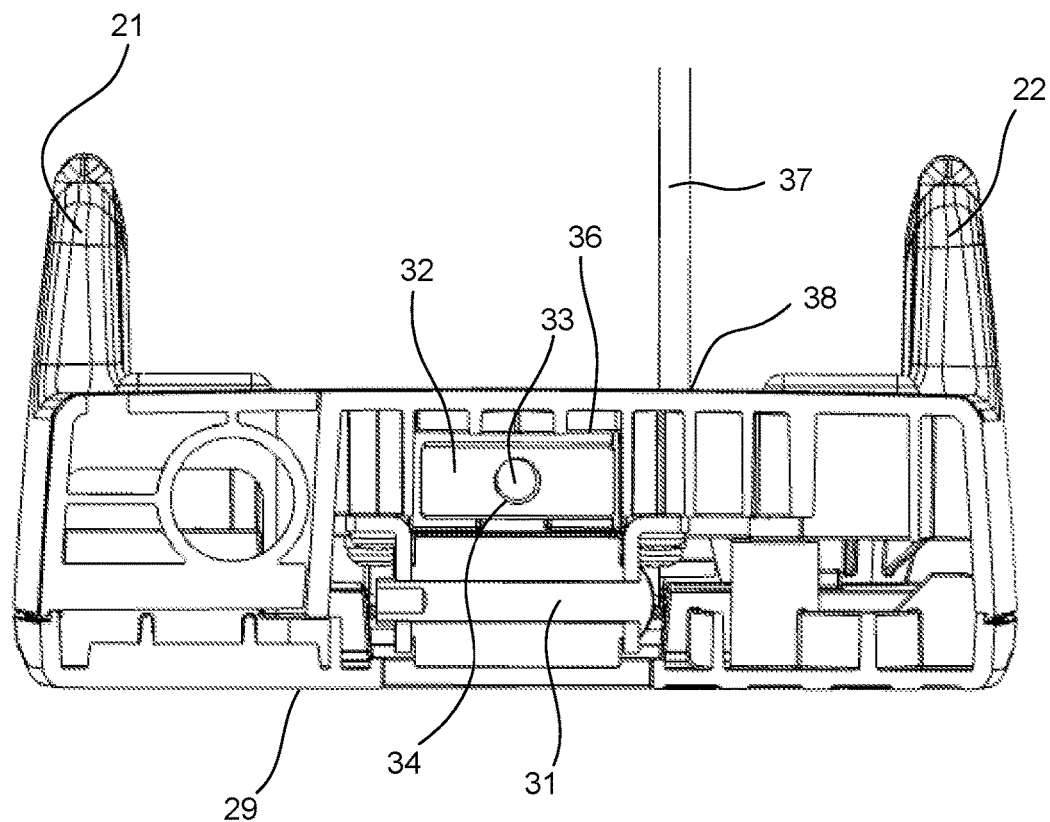
FIG. 13 shows the load connecting portion of FIG. 8 in a schematic sectional frontal view.

FIG. 8 shows the load connecting portion 2 arranged on but not fastened to a cross bar with a wing-shaped cross-sectional profile. The load connecting portion 2 comprises a strap 27 with a T-shaped distal end 28, which may be wrapped around the cross bar 4. The proximal end of the strap 27 is permanently attached to a first end of the load connecting portion 2. Furthermore, the load connecting portion 2 comprises a complimentary recess 26 in the upper wall section 25 of the load connecting portion 2, the recess 26 being provided at a second end of the load connecting portion 2 opposite the first end. FIG. 9 illustrates the distal end 28 of the strap 27 being received in the complimentary recess 26. Although not illustrated, the strap 27 may be tightened when wrapped around the cross bar, as shown in FIGS. 9 and 10, to fasten the load connecting portion 2 to the cross bar 4. For that purpose, the fastening device with the strap 27 comprises an actuation element 35 connected to a screw 33. The screw 33 engages a tightening portion 32 with complimentary threads 34 to pull an end of the strap 27 via the tightening portion 32 into an interior 36 of the load connecting portion 2, as can be taken from FIGS. 12 and 13. Specifically, the strap 27 is guided by a guide pulley 31 to be connected to the tightening portion 32. By turning the screw 33 via the actuation element 35, the tightening portion 32 is moved relatively to the screw 33, thereby pulling the strap 27 into the interior 36 of the load connecting portion 2 via the guide pulley 31. The strap 27 is thus fastened around the cross bar. For unfastening of the load connecting portion 2, the actuation element 35 needs to be turned into the opposite direction.

Figure 25:
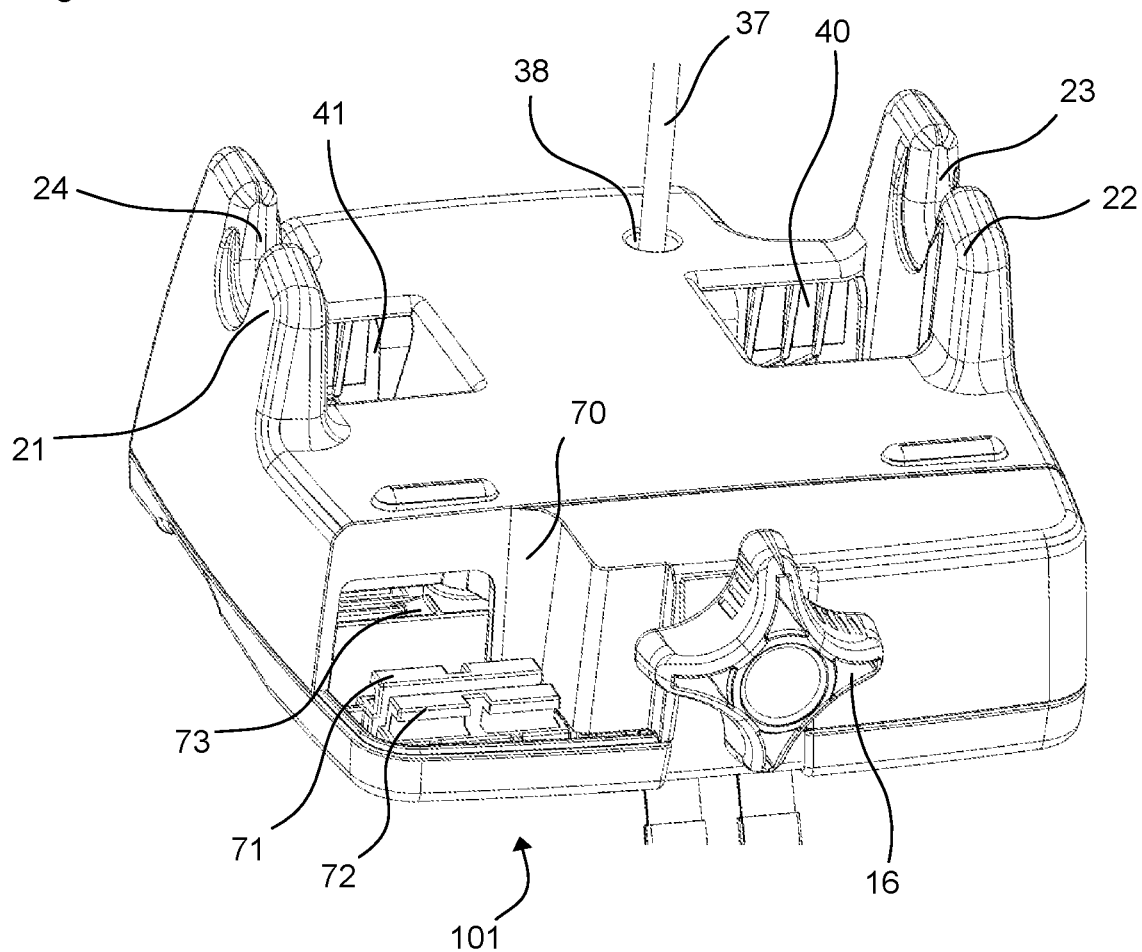
FIG. 25 shows the load connecting portion of the wheel holder of FIG. 1 without a door element of a lock system of the wheel holder.
Figure 26:
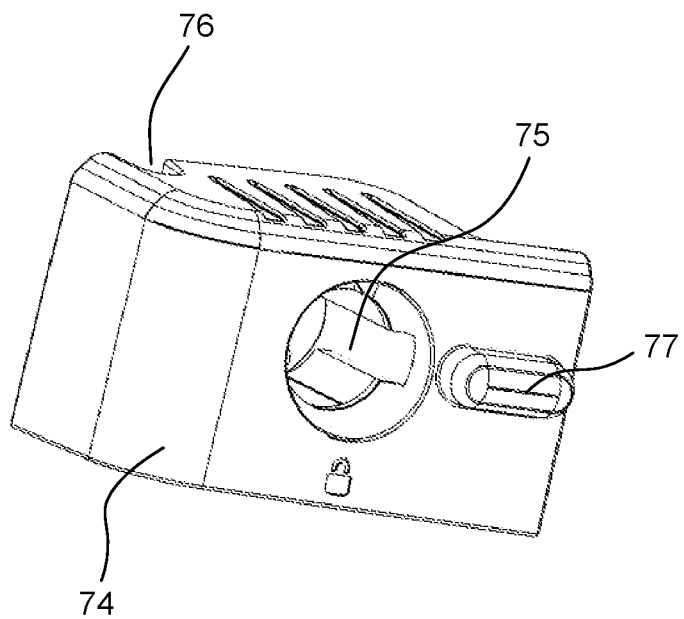
FIGS. 26 and 27 show the door element of the lock system in two different schematic perspective views.
Figure 27:
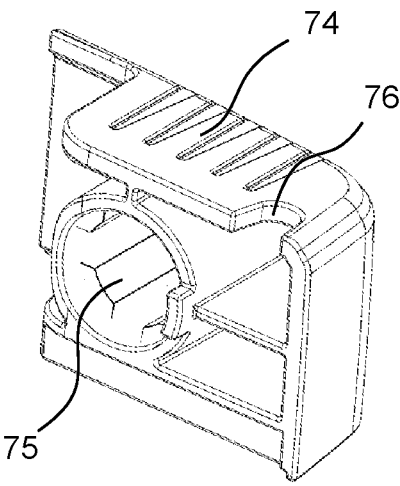
Figure 28:
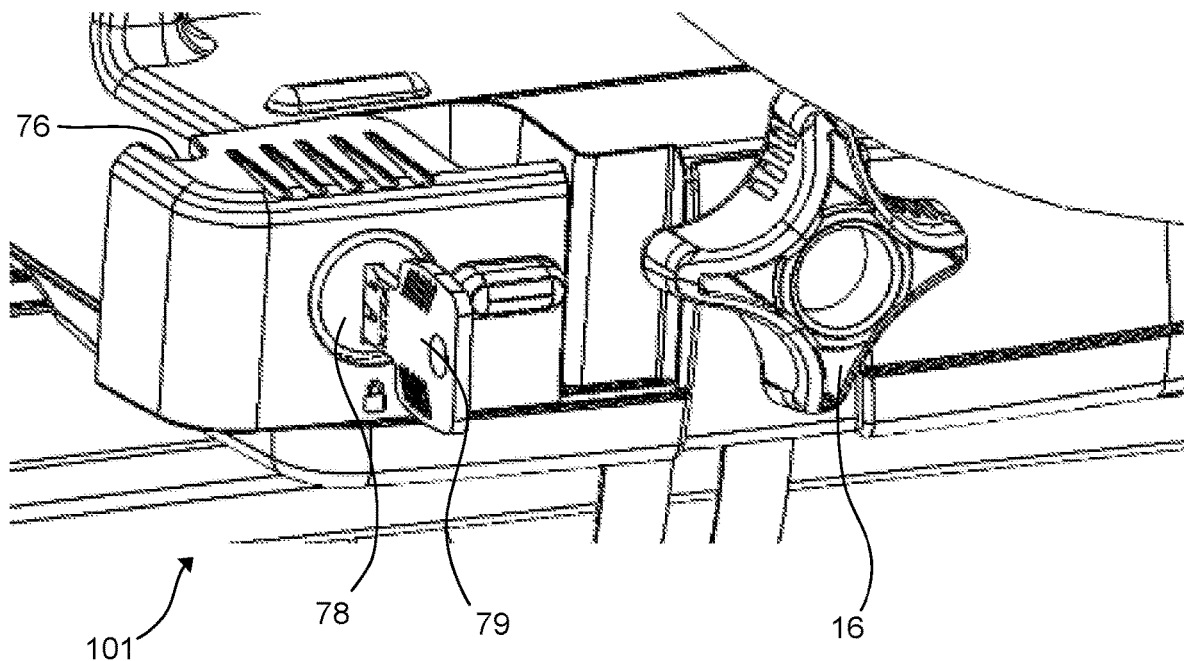
FIG. 28 illustrates the lock system in its unlocked state in a schematic perspective view.
Figure 29:
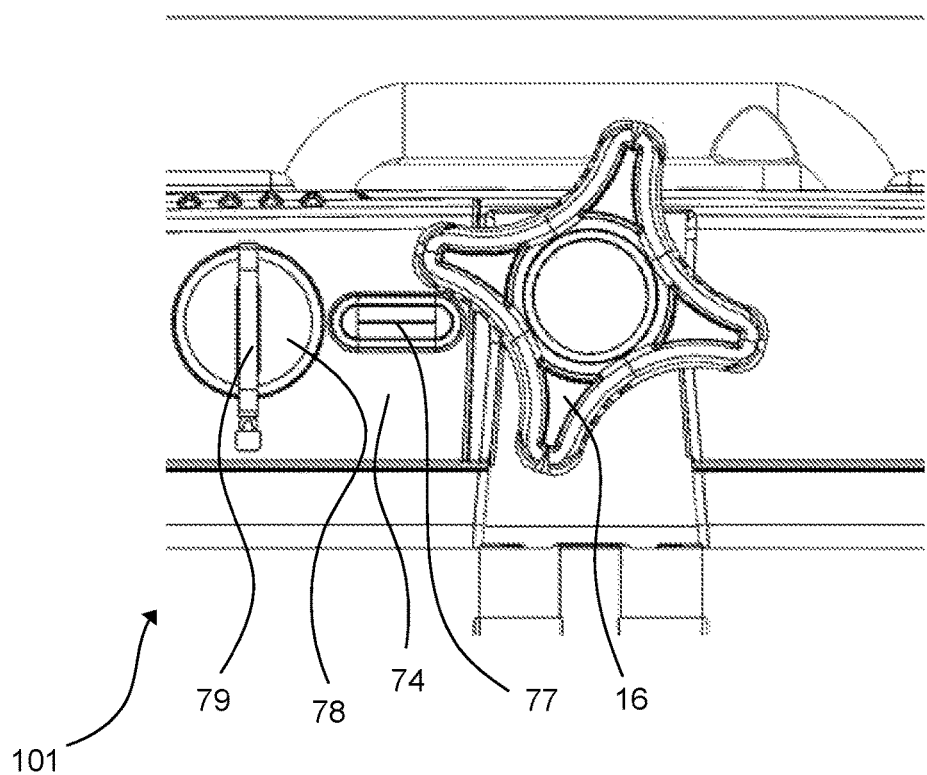
FIGS. 29 and 30 illustrate the lock system in its locked state in schematic perspective views.
Figure 30:
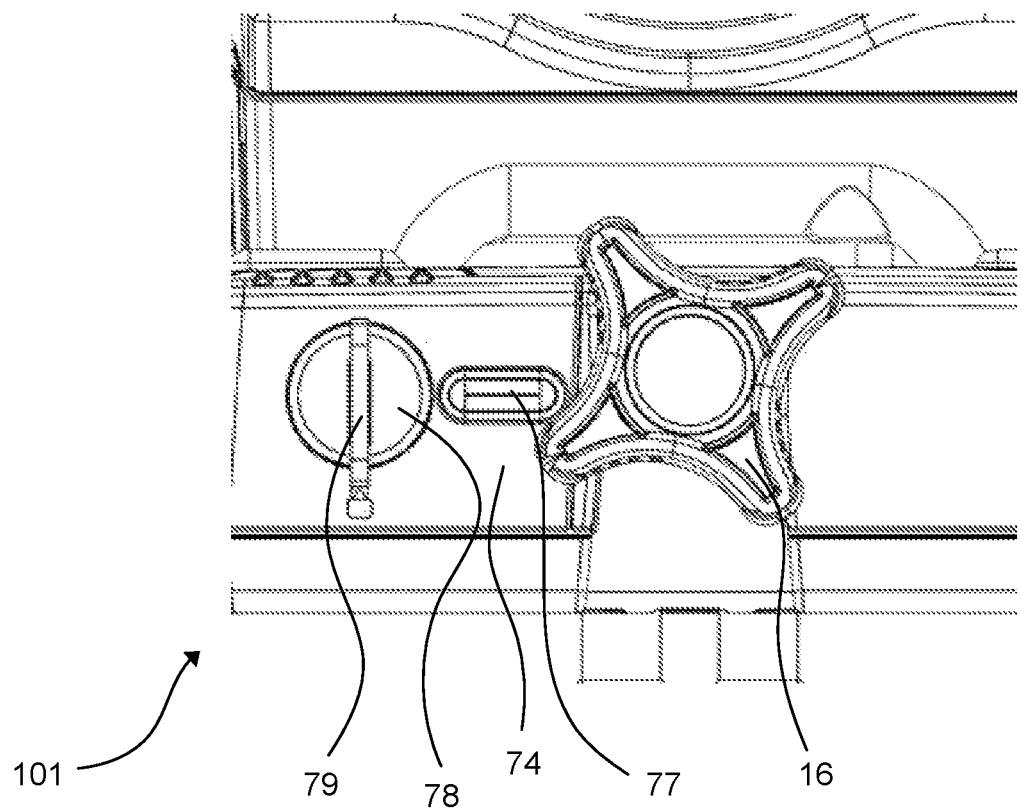

To prevent theft of the load 5, namely the bike wheel, or any part of the wheel holder 1, the wheel holder 1 comprises a lock system 101 providing an anti-theft function, which is primarily illustrated in FIGS. 25 to 31. The lock system 101 comprises a door element 74, which is slidingly provided at a corner of the first side of the load connecting portion 2, i.e. the side to which the strap 27 is permanently attached. The door element 74 may be moved translationally with respect to the load connecting portion 2 for adjusting the lock system 101 between a locked and an unlocked state. For that purpose, the load connecting portion 2 comprises two parallel guide elements 71, 72, which are formed as guide rails, as best seen in FIG. 25. The door element 74 and the guide rails 71, 72 are integrated into one corner of the load connecting portion 2. In the locked position, the door element 74 forms a flush exterior with the rest of the load connecting portion 2.

On its outer side, which forms part of the outer surface of the load connecting portion 2, the door element 74 is provided with a protrusion 77. In its unlocked position, corresponding to an unlocked state of the lock system 101, the protrusion 77 is spaced apart from the actuation element 16 for fastening and unfastening of the strap 27 to the cross bar. By sliding the door element 74 along the guide rail in a direction towards the actuation element 16, which corresponds to the longitudinal extension of the cross bar when the load connecting portion 2 is attached thereto, the door element 74 is adjusted into its locked position. In the locked position, the protrusion 77 may engage the wings of the actuation element 16. Accordingly, turning of the actuation element 16 is limited to the rotational spacing of two wings, essentially blocking turning of the actuation element 16. A maximum range of turning may be recognized by comparing FIGS. 29 and 30, both showing a different wing of the actuation element 16 engaging the protrusion 77 of the door element 74. Accordingly, unfastening of the strap 27 may be blocked.

Figure 31:
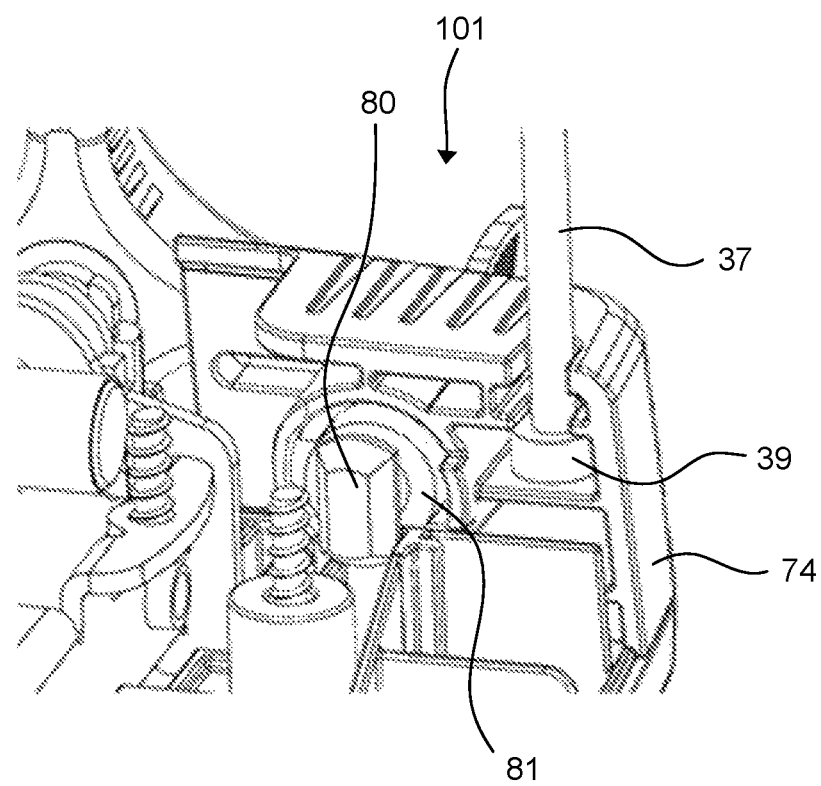
FIG. 31 illustrates an interior of the lock system in a schematic perspective view.

The lock system 101 further comprises a lock cylinder 78, which is arranged in a through hole 75 of the door element 74. At least in the locked state of the lock system 101, a part of the lock cylinder 78 may be turned with a key 79 of the lock system 101. The lock cylinder 78 comprises an undercut portion 80 at the end inserted into the through hole 85 of the door element 74. The undercut portion 80 is provided adjacent a cylinder portion 81 of the lock cylinder 78, as can be seen in FIG. 31. By turning the undercut portion 80 via the key 79, the cylinder 78 may engage an inner wall 73 (shown in e.g. FIG. 25) of the load connecting portion 2 to prevent adjustment of the door element 74 between its locked and unlocked positions. This is also illustrated in greater detail in FIG. 31. Accordingly, the door element 74 may be locked in place in the locked position via the lock cylinder 78, thereby locking the load connecting portion 2 to the cross bar with the lock system 101.

In addition, the lock system 101 may also lock the bike wheel 5 and the wheel holding member 3 to the load connecting portion 2 to prevent a theft. For that purpose, the lock system 101 comprises a lock element 37 in form of a wire, which can, for example, be seen in FIGS. 8 to 10 and in FIG. 25. A first end 38 of the lock element 37 is permanently attached to the load connecting portion 2. A second end 39 of the lock element 37 is provided with a flared base 39. The second end 39 is engageable with a recess 76 of the door element 74 when the door element is in its unlocked position. The attachment position of the first end 38 to the load connecting portion 2 and the recess 76 of the door element 74 are arranged at diagonally opposite locations of the load connecting portion 2. When sliding the door element 74 into the locked position, the second end 39 of the wire 37 is moved with the door element 74. In the locked position, the second end 39 may not be detached from the recess 76 of the door element 74 as a wall of the load connecting portion 2 encloses the recess 76 and blocks a movement away from the door element 74. As can be seen in FIG. 31, a diameter of the upper opening of the recess 74 that is left open in the locked position of the door element 74 has a smaller diameter than the flared base 39 but a larger diameter than the wire of the lock element 37.

Previous to engaging the lock system 101 with a sliding motion of the door element 74, the lock element 37 is passed through the bike wheel 5, in particular in between spokes, as can be seen e.g. in FIG. 1. Only afterwards, the lock element 37, i.e. the flared base 39 of the lock element 37, is arranged in the recess 76 of the door element 74. In the shown embodiments, the lock element 37 is short enough so that the wheel holding member 3 in its first predetermined position cannot be detached from the load connecting portion 2. Accordingly, the wheel holding member 3 is locked to the load connecting portion 2 together with the bike wheel 5. Alternatively or additionally, the lock system 101 may also comprise means to tighten the lock element 37. For example, said means may be similar to the tightening means for the strap 37. Alternatively or additionally, the lock system 101 may also be configured to allow the lock element to engage the wheel holding member 3. For example, the wheel holding member 3 may be provided with a through hole through which the lock element may be passed in addition to being passed through a through hole in the bike wheel 5.

Most of the figures show the load connecting portion 2 being attached to a load carrier 4 with a rounded cross-sectional shape, e.g. a wing-like cross-sectional shape. To prevent rotation and provide a secure seat, the cross bar facing side of the load connecting portion 2, i.e. the bottom side 29, has a cross bar engagement portion 30 with a profile adapted to the contour of the rounded cross bar to allow for a substantially gapless engagement. In addition, said engagement portion 30 may have some anti-rotation teeth and/or slide-preventing material, such as a rubber layer. The cross bar engagement portion 30 may be provided on a side opposite to a load connecting surface 20 of the load connecting portion 2. To allow attachment of the load connecting portion 2 to a cross bar with another cross-sectional shape, the wheel holder 1 may comprise an adapter 50. FIGS. 14 to 17 illustrate attachment of the load connecting portion 2 to a cross bar 4.1 with a rectangular, e.g. squared, cross-sectional shape.

Figure 11:
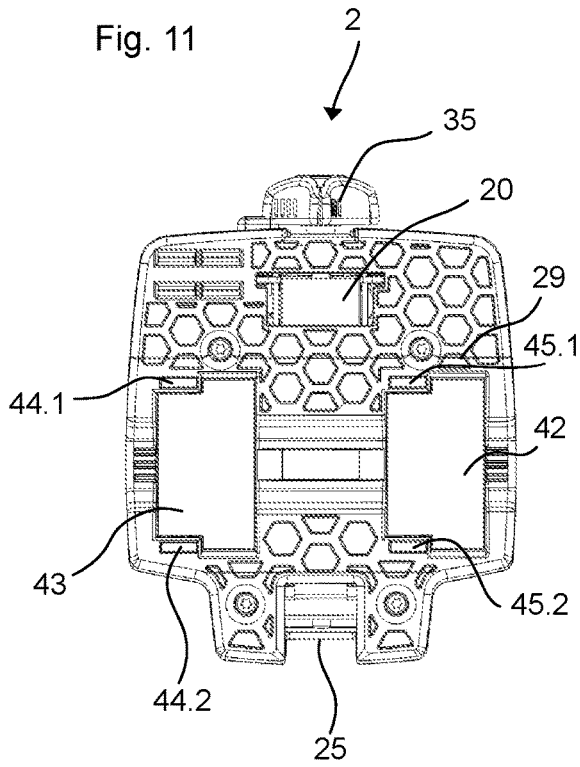
FIG. 11 shows the load connecting portion of FIG. 8 without the fastening strap in a schematic bottom view.
Figure 14:
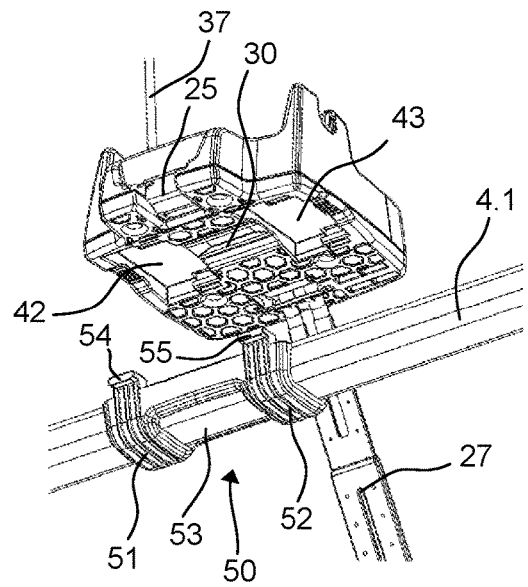
FIGS. 14 to 16 illustrate how the load connecting portion of FIG. 8 may be mounted to another cross-sectional type of cross bar via an adapter in schematic perspective views.

The adapter 50 may have an essentially U-shaped cross-section. Within the U-shaped adapter, a rectangular cross bar 4.1 may be accommodated. On its bottom side 29, as can be seen in FIG. 11, the load connecting portion 2 is provided with two attachment recesses 42 and 43 on opposite sides of the load connecting portion 2, e.g. at the sides between the first side to which the strap 27 is permanently attached and the second side at which the recess 26 is provided. As can be seen in FIG. 14, the adapter 50 is provided with corresponding feet elements 54, 55. The feet elements 54, 55 may be arranged in the recesses 42, 43 in a first position, preferably with both the load connecting portion 2 and the adapter 50 being arranged on the cross bar 4.1. By sliding the adapter 50 and the load connecting portion 2 relatively to each other along the longitudinal direction of the cross bar, the feet 54, 55 are brought into engagement with guide members 44.1, 44.2, 45.1 and 45.2 of the load connecting portion 2, which are provided in the recesses 42, 43. When engaged thereto, the adapter 50 may only be disengaged from the load connecting portion 2 by a reverse sliding motion.

Figure 15:
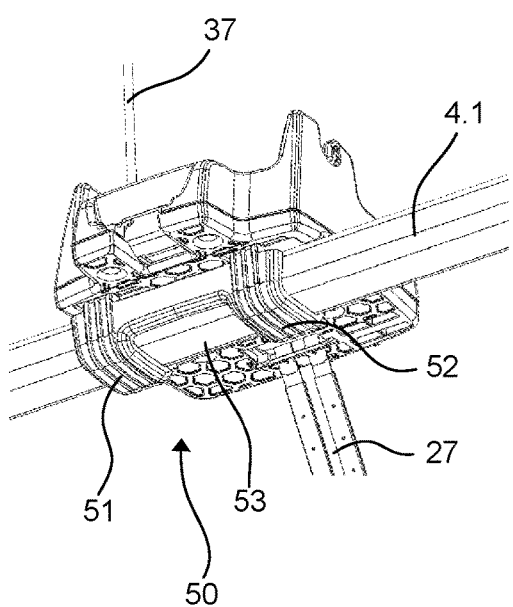
Figure 16:
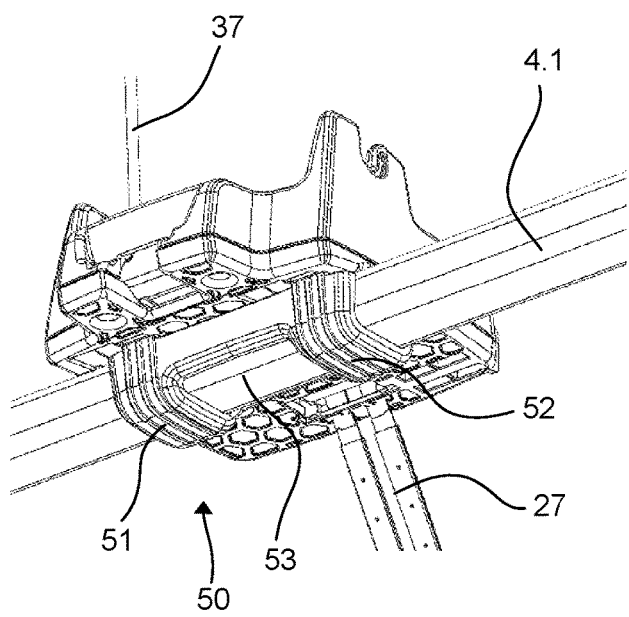
Figure 17:
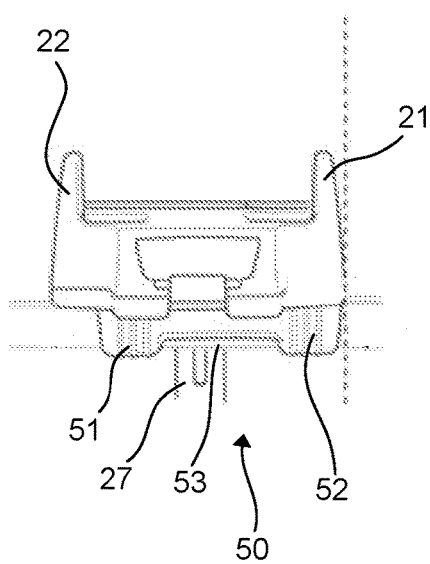
FIG. 17 shows the adapter attached to the load connecting portion of FIGS. 14 to 16 in a schematic frontal view.

The sliding motion for attaching the adapter 50 to the load connecting portion 2 may be best recognized by comparing FIGS. 15 and 16 with each other. FIG. 17 illustrates that an outer vertical wall of the adapter 50 and an outer vertical wall of the load connecting portion 2 are aligned with each other when both parts are connected to each other in the intended fashion. As derivable from FIG. 17, a stepless transition is formed in between both parts. Said alignment is illustrated in FIG. 17 with the dotted line. Previous to sliding the adapter 50 into attachment with the load connecting member 2, the adapter is arranged in an engagement position, as illustrated in FIG. 15, which corresponds to the first position. In the engagement position of the adapter 50, the feet elements 54, 55 are already received in the recesses 42, 43 of the load connecting portion 2 but the adapter 50 is not attached to the load connecting portion 2. In the engagement position, an outer vertical wall of the adapter 50 opposite to the outer vertical wall, which is aligned when the adapter 50 is connected to the load connecting portion 2 in the intended fashion, and an outer vertical wall of the load connecting portion 2 opposite to the outer vertical wall, which is aligned when the adapter 50 is connected to the load connecting portion 2 in the intended fashion, are similarly aligned. Specifically, when considering FIG. 17, the walls opposite to the dotted line, i.e. on the left side of the figure, are aligned in the engagement position.

As can be taken e.g. from FIG. 14, the adapter 50 comprises two bridge sections 51 and 52 forming the U-shaped cross section for accommodating the cross bar 4.1. In between, the adapter 50 has an engagement opening 53 that allows the strap 27 to engage with the cross bar 4.1 of the load carrier when being wrapped and tightened around the adapter 50 and the cross bar 4.1. This allows the strap 27 to still fasten the load connecting portion 2 to the cross bar 4.1 for providing a secure fastening. In addition, the strap may engage on side walls of the bridge sections 51, 52 facing the engagement opening 53, thus also preventing the adapter from being slid out of engagement with the load connecting portion 2. Accordingly, with the lock system 101 described above, it is also possible to lock the adapter 50 to the load connecting portion 2 via the engagement of the strap 27 with the bridge sections 51, 52 when locking the load connecting portion 2 to the load carrier 4.1.

Figure 32:
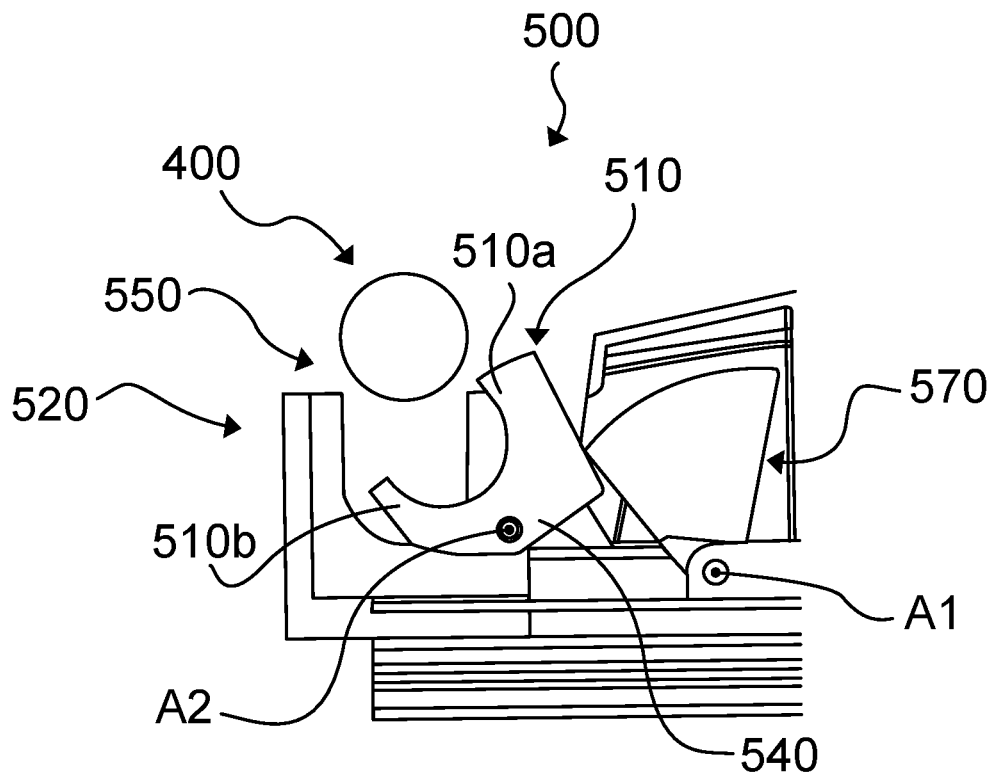
FIGS. 32 and 33 show a wheel holder for a vehicle according to a second embodiment.
Figure 33:
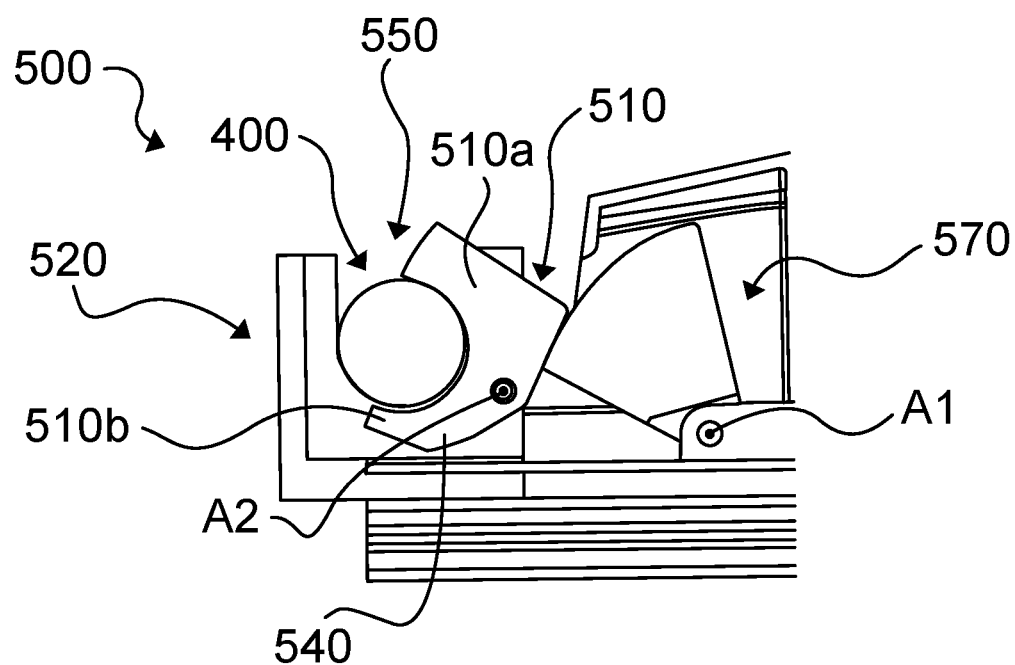

FIGS. 32 and 33 show a wheel holder 500 according to a second embodiment of the disclosure. The wheel holder 500 comprises a wheel holding member 400, which may be configured as the wheel holding member 3 of the first embodiment with the exception that instead of the bottom 12 with the guiding protrusions 14, 14.1, a cylindrical bolt is provided between the legs 8, 9. In FIGS. 32 and 33 only said cylindrical bolt (but not the legs) are illustrated. Furthermore, the wheel holder 500 comprises a load connecting portion 520, which may be attached to the roof of a vehicle, e.g. a cross bar of a load carrier, in conformity with the load connecting portion of the first embodiment, e.g. via an adapter 50. In addition, the wheel holder 500 comprises a docking device 550 configured for releasable attachment of the wheel holding member 400 to the load connecting portion 520. The docking device 550 is formed by the wheel holding member 400 and the load connecting portion 520, as will be described in more detail below. FIG. 32 shows the wheel holding member 400 detached from the load connecting portion 520. Due to the detachment, the bike wheel 5 may be attached to the wheel holding member 400 at a location remote from the load connecting portion 520. FIG. 33 shows the wheel holding member 400 attached to the load connecting portion 520.

The load connecting portion 520 is configured to receive and lock the wheel holding member 400 with a movement in only one direction. In this way, there is no need for a user to move the wheel holding member 400 in a direction which differs from the insertion direction. Instead, the docking device 550 may be brought into a fixation state, and thus also in a holding state, by a downward movement of the wheel holding member 400 in only one direction. According to the embodiment shown, the movement direction of the wheel holding member 400 can be a substantially vertical downward direction.

The load connecting portion 520 comprises a movable locking member 510 which is not translatory movably mounted but held rotatable about a pivot axis A2. The load connecting portion 520 can be configured as a U-shaped member with its opening oriented in vertical upward direction. The movable locking member 510 again comprises a U-shaped member 540 with an opening between two end portions 510a, 510b. The docking device 550 is configured so that the pivot axis A2 is arranged offset from an insertion path, preferably straight insertion path as defined by the load connecting portion 520. The U-shaped member is movable between an open position as shown in FIG. 32 and a closed position as shown in FIG. 33. In the open position, the U-shaped member is arranged inclined with respect to the U-shaped portion in the load connecting portion 520. In this way, the wheel holding member 400, i.e. the cylindrical bolt of the wheel holding member 400, may be received in the movable locking member 540 and may exert a force on lower end portion 510b leading to a rotation of the movable locking member 510 in such a manner that the upper end portion 510a is brought behind the cylindrical bold of the wheel holding member 400. The rotation of the movable locking member 510 into the locking position also enables a blocking member 570 to move behind the movable locking member, in particular that the blocking member 570 moves into a locking position in which the blocking member serves as an abutment preventing a rotation of the movable locking member 510 towards the open position as shown in FIG. 32.

The blocking member 570 can be biased towards the locking position by means of a biasing member. The biasing member can be a spring or any suitable urging member that allows to pre-bias the blocking member 570 in the desired direction. The spring may be a coil spring. If the blocking member 570 is biased towards the locking position, the blocking member 570 is able to automatically engage behind or with the movable locking member 510 when the at least one movable locking member 510 has been moved by a predetermined distance towards a positive locking position. Accordingly, the blocking member may be configured such that it rides on a portion of the movable locking member 510 and snaps behind the movable locking member 510 or alternatively into a recess or opening (not shown) when the same is moved up to a certain position. Dismounting may be achieved by operating a release lever (not shown) in order to return the blocking member into an unlocking state or unlocking position as is shown in FIG. 32. This enables the wheel holding member 400 to be pulled upwards, thereby rotating the locking member into the open position as shown in FIG. 32.

The invention claimed is:

1. A wheel holder for a vehicle for attaching a wheel of a bicycle to a rooftop of a vehicle, the wheel holder comprising:
    a docking device comprising a load connecting portion and a wheel holding member,
    wherein the load connecting portion is configured to be attached to a cross bar of a vehicle,
    wherein the wheel holding member is separate from a frame of the bicycle and configured to releasably attach to the load connecting portion to allow attachment of the wheel to the wheel holding member at a location remote from the load connecting portion, and
    wherein, by moving the wheel holding member towards the load connecting portion in a vertical downward direction, the docking device is brought into a holding state in which it holds the wheel holding member against gravity without further securement.

2. The wheel holder according to claim 1, wherein the docking device is configured for releasable attachment of the wheel holding member to the load connecting portion in a first predetermined attachment position.

3. The wheel holder according to claim 2, wherein the docking device is configured for releasable attachment of the wheel holding member to the load connecting portion in the first and in a second predetermined attachment position.

4. The wheel holder according to claim 3, wherein the wheel holding member extends upwards in an upright position or at a predetermined angle from vertical in the first predetermined attachment position or the wheel holding member extends horizontally in the second predetermined attachment position when the wheel holder is attached to a load carrier and the load carrier to the vehicle in the intended fashion.

5. The wheel holder according to claim 3, wherein the docking device comprises at least one male member and at least one complementary female member, which define the first or second predetermined attachment position when engaged with each other.

6. The wheel holder according to claim 5, wherein the at least one male member is configured as a guiding protrusion, and the at least one complementary female member is configured as a trough shaped recess.

7. The wheel holder according to claim 3, wherein a flat surface of the wheel holding member and a protrusion of the load connecting portion define the predetermined second attachment position.

8. The wheel holder according to claim 3, wherein the docking device comprises a separate fixation device for bringing the docking device into a fixation state in which the wheel holding member is fixed to the load connecting portion in the first or second predetermined attachment position.

9. The wheel holder according to claim 8, wherein the fixation device comprises a clamping bolt.

10. The wheel holder according to claim 9, wherein the fixation device comprises at least one wall with a bearing recess for accommodating the clamping bolt, and
wherein the wall comprises teeth for preventing a rotation of the wheel holding member and the load connecting portion with respect to each other.

11. The wheel holder according to claim 9, wherein the fixation device comprises two walls each having a bearing recess for accommodating the clamping bolt, and
wherein the wheel holding member is clamped in between said two walls via the clamping bolt to fix the wheel holding member to the load connecting portion.

12. The wheel holder according to claim 3, wherein the docking device is configured for releasable attachment of the wheel holding member to the load connecting portion only in the first and second predetermined attachment positions.

13. The wheel holder according to claim 3, wherein the wheel holding member may only be adjusted between the first and second predetermined attachment positions by releasing the wheel holding member from the load connecting portion.

14. The wheel holder according to claim 1, wherein the docking device, when in the holding state, is configured to hold the wheel holding member in place when arranged on the load connecting portion without the wheel holding member being fixed to the load connecting portion.

15. The wheel holder according to claim 1, wherein by moving the wheel holding member towards the load connecting portion, the docking device is brought into a fixation state in which the wheel holding member is fixed to the load connecting portion.

16. The wheel holder according to claim 15, wherein the docking device comprises a bolt and a receiving space for accommodating the bolt and a locking member for fixing the bolt in the receiving space in a locking position.

17. The wheel holder according to claim 16, wherein the docking device comprises a blocking element for blocking the locking member in the locking position.

18. The wheel holder according to claim 1, wherein the wheel holding member is configured as a U-shaped element.

19. The wheel holder according to claim 18, wherein a bottom of the U-shaped element is configured for attachment to the load connecting portion.

20. The wheel holder according to claim 1, wherein the load connecting portion is configured to be releasably mounted to a first cross-sectional type of cross bar, and wherein the wheel holder further comprises an adapter and is configured to be mounted to a different, second cross-sectional type of cross bar via the adapter.

21. The wheel holder according to claim 20, wherein the load connecting portion is configured for a releasable attachment to the adapter by a sliding motion.

22. The wheel holder according to claim 1, the wheel holder comprising a lock system for an anti-theft function, which is adjustable between a locked state, in which the wheel is locked to the wheel holding portion and the load connecting portion is locked to a load carrier, and an unlocked state by a sliding motion.

23. The wheel holder according to claim 1, wherein the load connecting portion is releasably attachable to a cross bar of a load carrier,
wherein the load connecting portion comprises a cross bar engagement portion having a profile adapted to the contour of the cross bar for reliable engagement with the cross bar, and a load connecting surface opposite the cross bar engagement portion configured for the attachment of the wheel holding member,
wherein the load connecting portion is configured to be attached to the cross bar such that the cross bar engagement portion is in contact with the cross bar and such that by moving the wheel holding member towards the load connecting surface of the load connecting portion in a vertical downward direction, the docking device is brought into a holding state in which it holds the wheel holding member against gravity.

24. A method of mounting a wheel of a bicycle to a vehicle, comprising the steps of:
attaching a load connecting portion of a wheel holder to a cross bar of the vehicle;
attaching the wheel of the bicycle to a wheel holding member of the wheel holder separate from a frame of the bicycle; and
subsequently attaching the wheel holding member, with the wheel attached, to the load connecting portion provided by moving the wheel holding member towards the load connecting portion in a vertical downward direction,
wherein the wheel holding member is configured to releasably attach to the load connecting portion to allow attachment of the wheel to the wheel holding member at a location remote from the load connecting portion.

25. A wheel holder for a vehicle for attaching a wheel of a bicycle to a rooftop of a vehicle, the wheel holder comprising:
a docking device comprising a load connecting portion and a wheel holding member,
wherein the load connecting portion is configured to be attached to a cross bar of a vehicle;
wherein the wheel holding member is separate from a frame of the bicycle, configured to releasably attach to the wheel of the bicycle by receiving an end of an axle of the wheel, and configured to releasably attach to the load connecting portion to allow attachment of the wheel to the wheel holding member at a location remote from the load connecting portion,
wherein the docking device comprises a guiding protrusion integral with one of the wheel holding member or the load connecting portion, and a recess provided in the other of the wheel holding member and the load connecting portion,
wherein the guiding protrusion and the recess engage to bring the docking device into a holding state in which it holds the wheel holding member against gravity.

26. The wheel holder according to claim 25, wherein the guiding protrusion is integral with the wheel holding member, and the recess is provided in the load connecting portion.

* * * * *

UNITED STATES PATENT AND TRADEMARK OFFICE
CERTIFICATE OF CORRECTION

PATENT NO. : 12,065,106 B2
APPLICATION NO. : 17/121136
DATED : August 20, 2024
INVENTOR(S) : Rosenqvist et al.

It is certified that error appears in the above-identified patent and that said Letters Patent is hereby corrected as shown below:

In the Claims

In Column 30, Claim 1, Line 29, delete "a vehicle," and insert -- the vehicle, --, therefor.

In Column 30, Claim 1, Line 34, delete "a vehicle," and insert -- the vehicle, --, therefor.

In Column 32, Claim 24, Line 32, before "by" delete "provided".

In Column 32, Claim 25, Line 41, delete "a vehicle," and insert -- the vehicle, --, therefor.

In Column 32, Claim 25, Line 46, delete "a vehicle," and insert -- the vehicle, --, therefor.

Signed and Sealed this
Eighth Day of October, 2024

Katherine Kelly Vidal
*Director of the United States Patent and Trademark Office*